United States Patent
QiU et al.

(10) Patent No.: US 11,483,025 B2
(45) Date of Patent: Oct. 25, 2022

(54) SYSTEM AND METHOD FOR PROVIDING A UNIFIED GLOBAL NAVIGATION SATELLITE SYSTEM (GNSS) RECEIVER

(71) Applicant: Samsung Electronics Co., Ltd., Gyeonggi-do (KR)

(72) Inventors: Sigang QiU, Sunnyvale, CA (US); Henry Falk, Long Beach, CA (US)

(73) Assignee: Samsung Electronics Co., Ltd

( * ) Notice: Subject to any disclaimer, the term of this patent is extended or adjusted under 35 U.S.C. 154(b) by 245 days.

(21) Appl. No.: 16/869,297

(22) Filed: May 7, 2020

(65) Prior Publication Data

US 2021/0173089 A1 Jun. 10, 2021

Related U.S. Application Data

(60) Provisional application No. 62/946,118, filed on Dec. 10, 2019.

(51) Int. Cl.
*H04B 1/7075* (2011.01)
*G01S 19/30* (2010.01)
*G01S 19/29* (2010.01)

(52) U.S. Cl.
CPC .......... *H04B 1/70757* (2013.01); *G01S 19/29* (2013.01); *G01S 19/30* (2013.01); *H04B 1/7075* (2013.01)

(58) Field of Classification Search
CPC .......... G01S 19/29; G01S 19/30; G01S 19/33; H04B 1/7075; H04B 1/70757
See application file for complete search history.

(56) References Cited

U.S. PATENT DOCUMENTS

| 5,202,693 A | * | 4/1993 | Lee | G01S 19/30 342/357.75 |
| 6,366,599 B1 | * | 4/2002 | Carlson | G01S 19/30 375/130 |
| 7,546,423 B2 | | 6/2009 | Underbrink et al. | |
| 7,573,337 B2 | * | 8/2009 | Wang | G01S 19/29 327/107 |
| 8,509,286 B2 | | 8/2013 | Hodgart | |
| 8,604,974 B2 | | 12/2013 | Ganeshan et al. | |
| 8,964,813 B2 | | 2/2015 | Hodgart et al. | |
| 9,176,233 B2 | | 11/2015 | Khalili et al. | |
| 9,766,338 B2 | | 9/2017 | Kurby et al. | |
| 9,784,845 B2 | | 10/2017 | Lennen | |

(Continued)

FOREIGN PATENT DOCUMENTS

EP 1933468 A1 * 6/2008 ........... G01S 19/235

OTHER PUBLICATIONS

J.-A. Avila-Rodriguez et al., The MBOC Modulation: A Final Touch for the Galileo Frequency and Signal Plan, InsideGNSS, p. 43-58, Sep./Oct. 2007 (Year: 2007).*

*Primary Examiner* — Bernarr E Gregory
*Assistant Examiner* — Fred H Mull
(74) *Attorney, Agent, or Firm* — The Farrell Law Firm, P.C.

(57) ABSTRACT

A method and system are provided. The method includes receiving, by a GNSS receiver, a GNSS signal, rotating, by a carrier rotator, samples of the GNSS signal with carrier phase inputs, inverting, by a chip matched filter (CMF), the rotated samples, and generating, by the CMF, an output based on the inverted samples.

20 Claims, 23 Drawing Sheets

(56) References Cited

U.S. PATENT DOCUMENTS

| | | | |
|---|---|---|---|
| 2004/0004570 A1* | 1/2004 | Townsend | G01S 19/25 |
| | | | 342/357.44 |
| 2004/0213334 A1* | 10/2004 | Ledvina | G01S 19/30 |
| | | | 375/150 |
| 2005/0012664 A1* | 1/2005 | Gerein | G01S 19/30 |
| | | | 701/469 |
| 2007/0274374 A1 | 11/2007 | Abraham | |
| 2010/0134354 A1 | 6/2010 | Lennen | |
| 2016/0327652 A1* | 11/2016 | Macleod | G01S 19/30 |

* cited by examiner

FIG. 6 Configuration for 12fx sampling: GPS

FIG. 7 Configuration for 24fx sampling: GPS

FIG. 9 Configuration for 12fx sampling: BOC(1, 1)

FIG. 10 Configuration for 24fx sampling: BOC(1, 1)

FIG. 11 Configuration for 12fx sampling: BOC(6, 1)

FIG. 12 Configuration for 24fx sampling: BOC(6, 1)

FIG. 13 Configuration for 12fx sampling: CBOC

FIG. 14 Configuration for 24fx sampling: CBOC

FIG. 17 Full Chip Summation

SYSTEM AND METHOD FOR PROVIDING A UNIFIED GLOBAL NAVIGATION SATELLITE SYSTEM (GNSS) RECEIVER

PRIORITY

This application is based on and claims priority under 35 U.S.C. § 119(e) to U.S. Provisional Patent Application filed on Dec. 10, 2019 in the United States Patent and Trademark Office and assigned Ser. No. 62/946,118, the entire contents of which are incorporated herein by reference.

FIELD

The present disclosure is generally related to global navigation satellite system (GNSS) signal processing. In particular, the present disclosure is related to a unified GNSS receiver.

BACKGROUND

A GNSS receiver receives and processes signals from a GNSS satellite constellation to determine a location/position of the receiver. A GNSS receiver typically focusses on bi-phased shift keying (BPSK) modulated signals. Satellite signals are recovered and sampled at 8fx sampling rate.

Due to the emergence of GNSS such as Galileo, Beidou, and Glonass, in addition to the global positioning system (GPS), efficient and spectrally relevant signals are desired. For example, Galileo and GPS will share two central frequencies and will both send several signals on common carriers. This means that other signal modulations may be required to minimize inter-system and intra-system interference. For example, a binary offset carrier (BOC) modulation scheme provides a split spectrum that spectrally isolates the signal from the BPSK modulation. Thus, it is desirable to receive both the existing L1 signals and the new signals to enhance overall system performance. Various types of BOC signals are introduced for GPS L1C, Beidou B1C, Galileo and Glonass code division multiple access (CDMA) navigation systems.

SUMMARY

According to one embodiment, a method includes receiving, by a GNSS receiver, a GNSS signal, rotating, by a carrier rotator, samples of the GNSS signal with carrier phase inputs, inverting, by a chip matched filter (CMF), the rotated samples, and generating, by the CMF, an output based on the inverted samples.

According to one embodiment, a system includes a GNSS receiver configured to receive a GNSS signal, a carrier rotator configured to rotate samples of the GNSS signal with carrier phase inputs, and a CMF configured to invert the rotated samples and generate an output based on the inverted samples.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
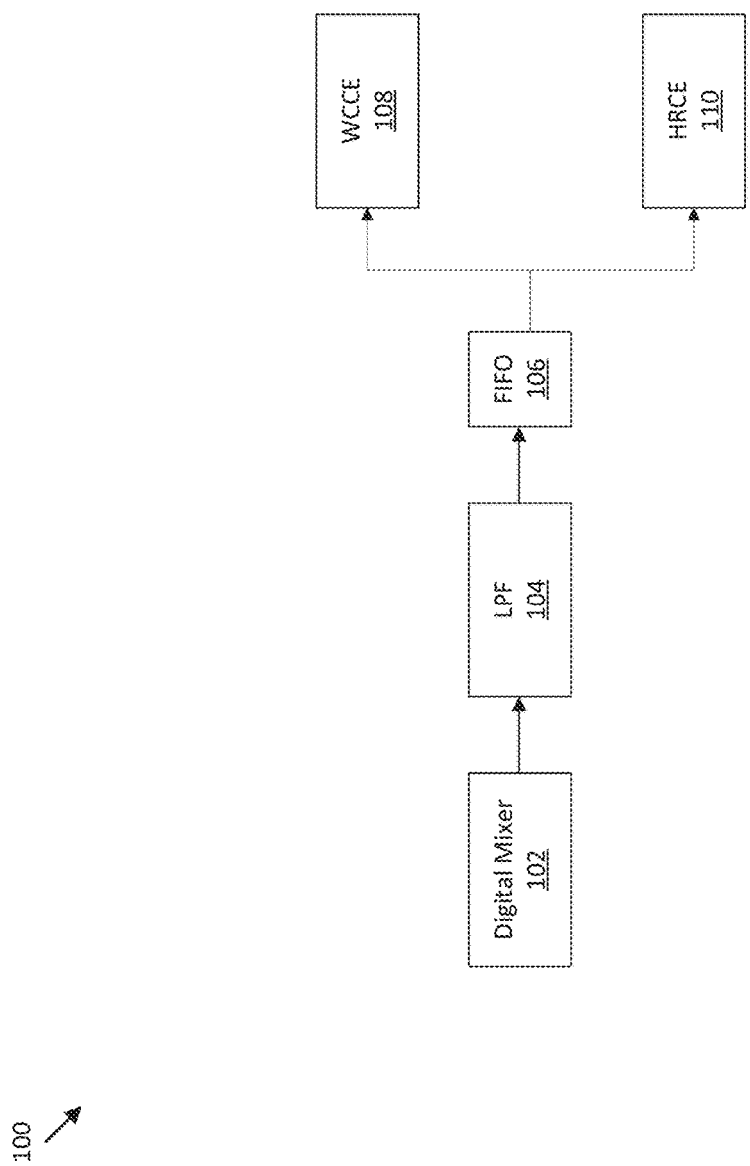
FIG. 1 illustrates a diagram of a GNSS receiver, according to an embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present system and method provide an architecture for tracking BPSK modulated L1 signals and BOC modulated signal combinations. This allows optimal design techniques by utilizing different signal properties, enhancing the system performances and improving interference-impairment sensitivities. The architecture is design configurable to fit for both high-performance and cost-effective low-power product design.

The present disclosure provides a GNSS receiver design architecture as a unified design. The example design is showing a multiple of 12fx sampling rate domain functions (where fx=1.0230625 MHz) to handle both legacy GNSS signals and the new navigation signals.

Compared to existing legacy designs, the present system and method is capable of receiving the common legacy GNSS L1 signals as well as the new satellite signals with mixed BOC combinations such as GPS L1C with TMBOC and Beidou B1C with quadrature-multiplexed BOC (QM-BOC), and helps to achieve optimal system performances. QMBOC is the TMBOC used by Beidou B1C. The present system and method are also dynamically evolving to receive future new satellite signals, projecting the future trend of new satellite signals in the mixed BOC combinations. It can be designed to support both high performance required products and cost-effective required low power products.

The present system and method handles all the GNSS satellite signals covering not only legacy GPS signals for example but also the advanced GNSS signals with various BOC signal combinations. The present system and method architecture is also dynamically evolving (i.e., the architecture can be dynamically evolved to support new satellite signals), adding benefits of time to market with the new signal support features.

The present system and method provides enhanced CMF architecture to combine time offset signals modified in a fashion to handle the various GNSS signal structures like mixed BOC and future GNSS signals, using inversion and scaling of the time segments for example. The present system and method provides a HRCE and a widely configurable correlation engine (WCCE) design architecture to utilize the enhanced CMF to produce correlation results. The HRCE is a correlation engine used to perform high resolution correlations. The WCCE is a correlation engine is used to perform widely configurable matched filter (MF) correlations and is used for satellite acquisition and tracker operations.

FIG. 1 illustrates a diagram of a GNSS receiver, according to an embodiment. The GNSS receiver includes a digital mixer 102, a low pass filter (LPF) 104, a first-in first-out (FIFO) operation block 106, a WCCE 108 and HRCE 110. The GNSS receiver 100 receives a GNSS signal and passes it through the mixer 102, the LPF 104 and the FIFO operation 106. The WCCE 108 is used to perform widely configurable matched filter (MF) correlations and is used for satellite acquisition and tracker operations. The sampling rate is dynamically configurable with examples of 12fx and 2fx. The hardware architecture is designed to perform tracking loops in hardware or software. The HCCE 110 is used to perform high resolution correlations with 4 bits IQ samples and 24fx sampling. The outputs of the WCCE 108 and the HCCE 110 are buffered to a memory for software to perform GNSS satellite acquisition and tracking measurements, allowing the software to perform various GNSS signal data combining to enhance the overall system performances.

Figure 2:
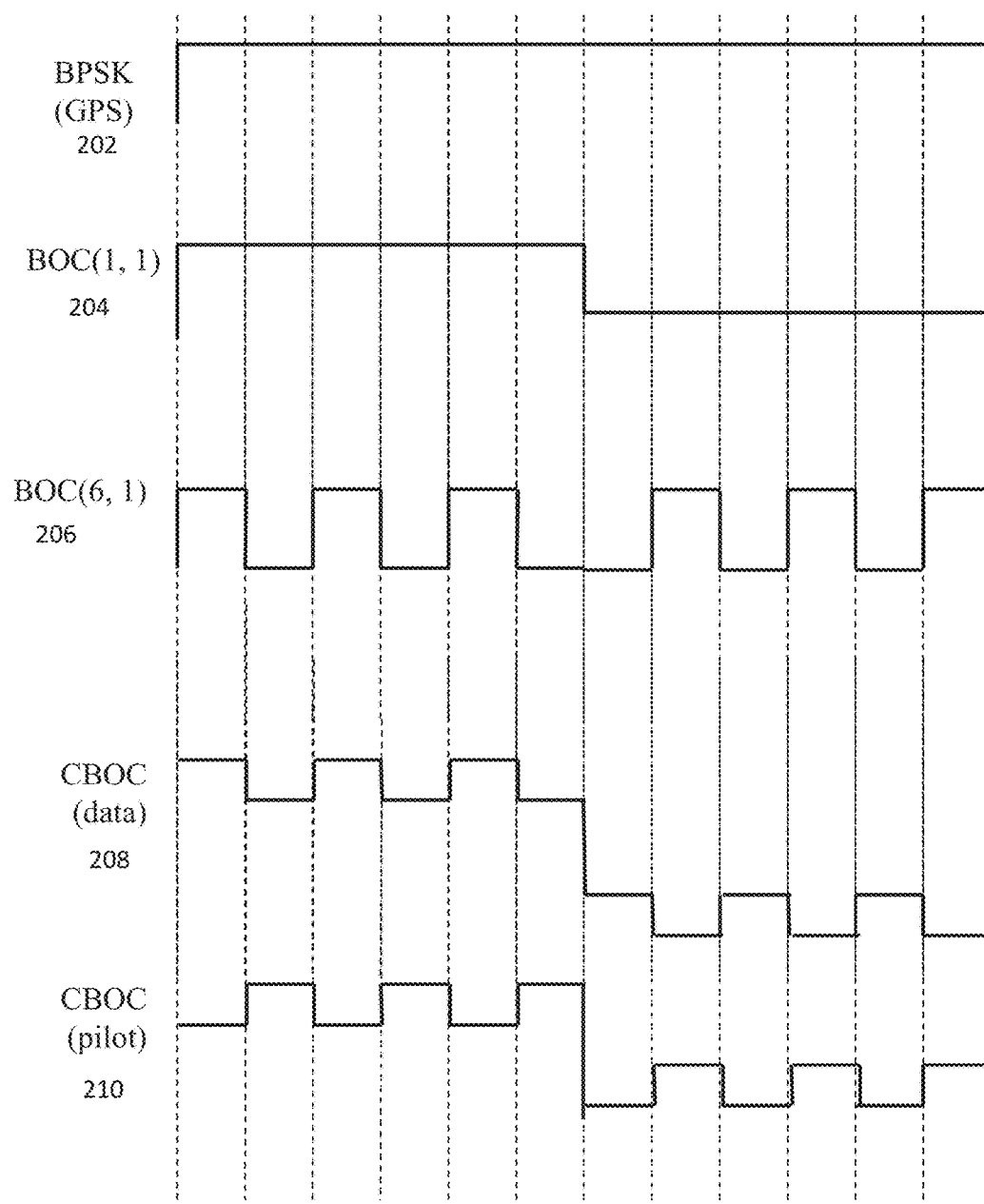
FIG. 2 illustrates a diagram of different GNSS signal waveforms, according to an embodiment.

FIG. 2 illustrates a diagram of different GNSS signal waveforms, according to an embodiment. FIG. 2 shows a GPS signal 202, a BOC(1,1) signal 204, a BOC(6,1) signal 206, a CBOC data signal 208, and a CBOC pilot signal 210.

Figure 3:
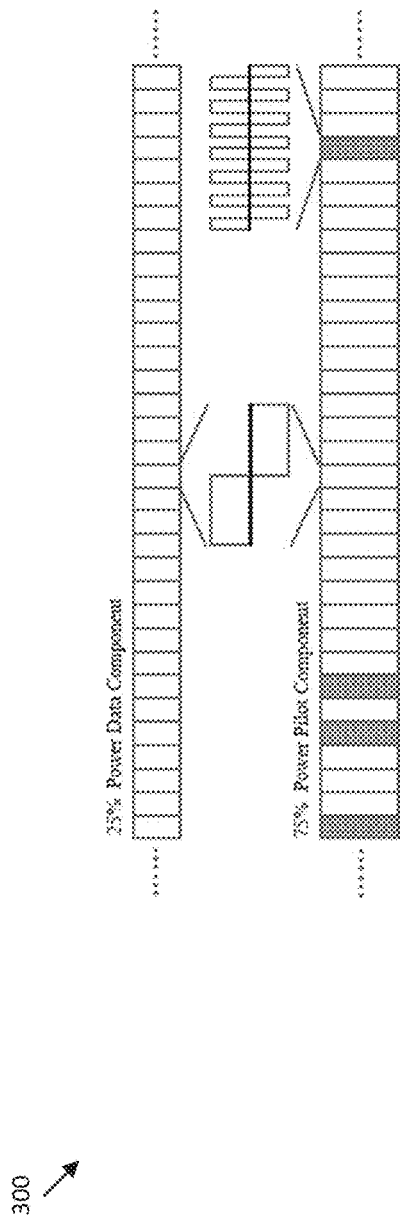
FIG. 3 illustrates a time multiplexed (TMBOC) signal, according to an embodiment.
Figure 4:
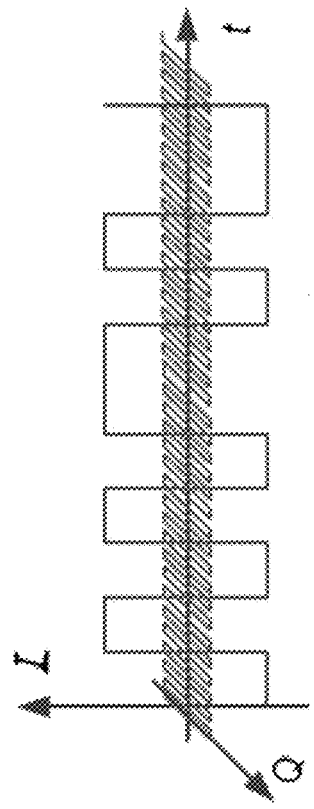
FIG. 4 illustrates a quadrature multiplexed BOC (QM-BOC) signal, according to an embodiment.

FIG. 3 illustrates a TMBOC signal, according to an embodiment. A TMBOC signal is time modulated between BOC(1,1) and BOC(6,1). FIG. 4 illustrates a QMBOC signal, according to an embodiment. A QMBOC signal is concurrently transmitted between BOC(1,1) and BOC(6,1) using in-phase and quadrature-phase.

Figure 5:
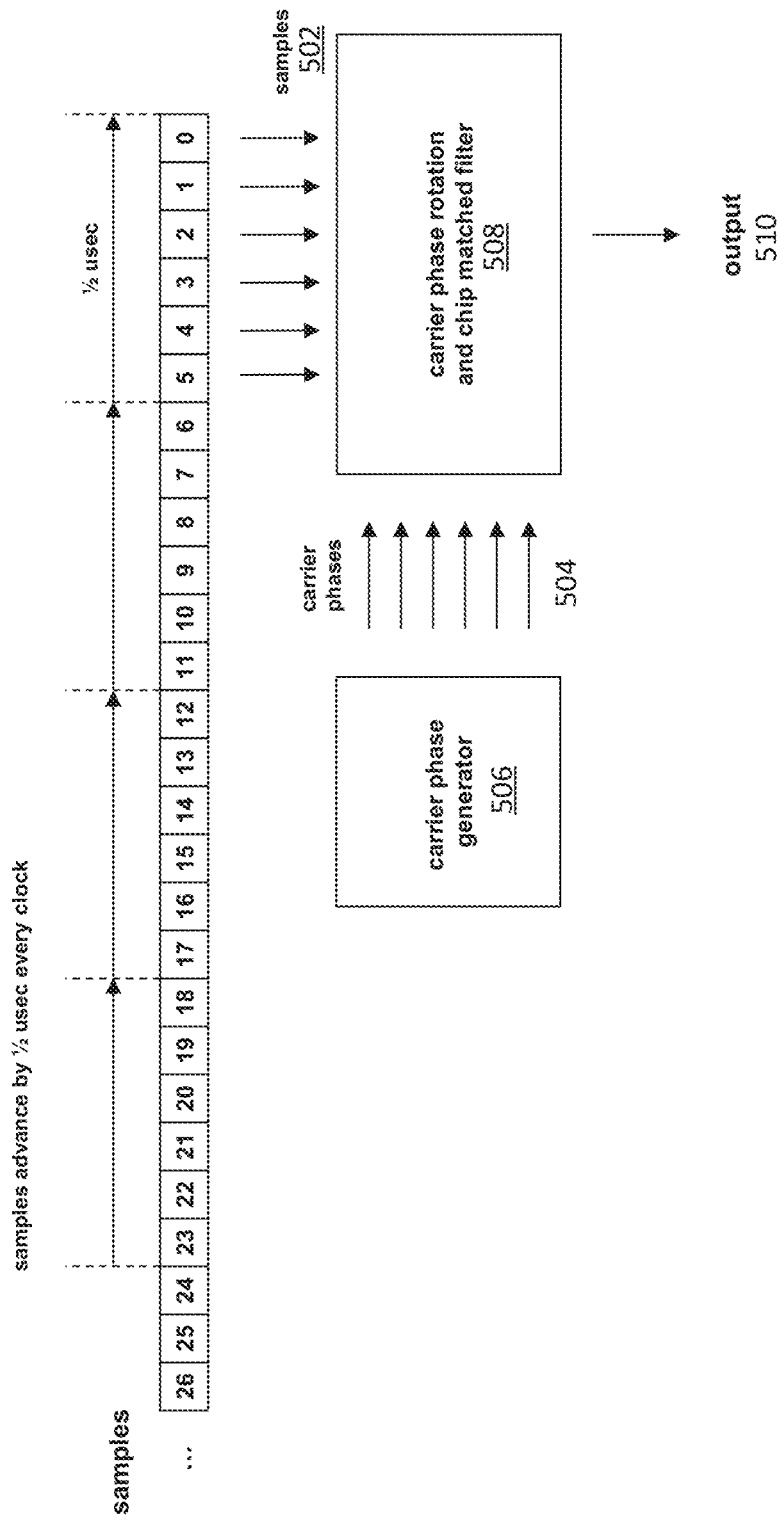
FIG. 5 illustrates a diagram of a carrier rotator and chip matched filter (CMF), according to an embodiment.

FIG. 5 illustrates a diagram of a carrier rotator and CMF, according to an embodiment. As shown in FIG. 5, samples 502 and carrier phases 504 generated by a carrier phase generator 506 are fed into the carrier phase rotation and CMF block 508 to provide an output 510.

Figure 6:
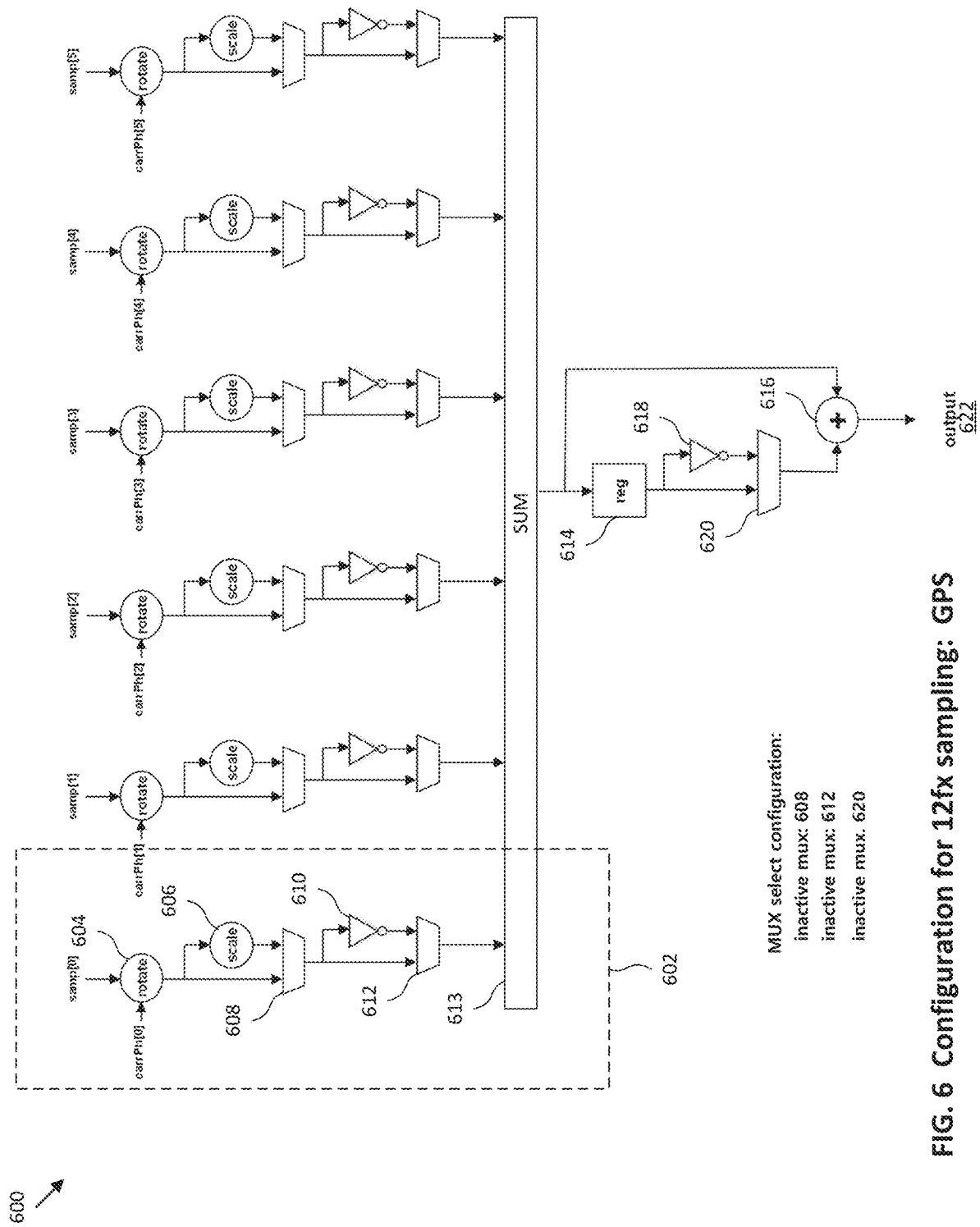
FIG. 6 illustrates a diagram of a CMF configuration for a GPS signal in 12fx sampling, according to an embodiment.

FIG. 6 illustrates a diagram of a CMF configuration for a GPS signal in 12fx sampling, according to an embodiment. The CMF 600 receives six samples (samp[0]-samp[5]). For ease of description, the first track 602 will be described, but the description applies to all tracks shown. The CMF 600 processes the signal through a rotate function 604 with a carrier phase input (carrPh[0]). The CMF 600 processes the output of the rotate function 604 through a scaling operation 606 and combines the output of the scaling operation 606 with the output of the rotate function 604 at 608. The CMF 600 processes the output of 608 through an inverter 610 and combines the output of 608 with the output of the inverter 610 at 612. The CMF 600 sums the output of each track at 613. The CMF 600 sends the summation to a register delay function (reg) block 614 that provides a 1 clock delay to the data path and to an accumulator 616. The CMF 600 processes the output of the reg block 614 through an inverter 618 and combines the output of the reg block 614 with the output of the inverter 618 at 620. The CMF 600 accumulates the output of 620 with the summation to produce output signal 622. The scaling operation 606, the inverter 610 and the inverter 618 are unused for the design mode.

Figure 7:
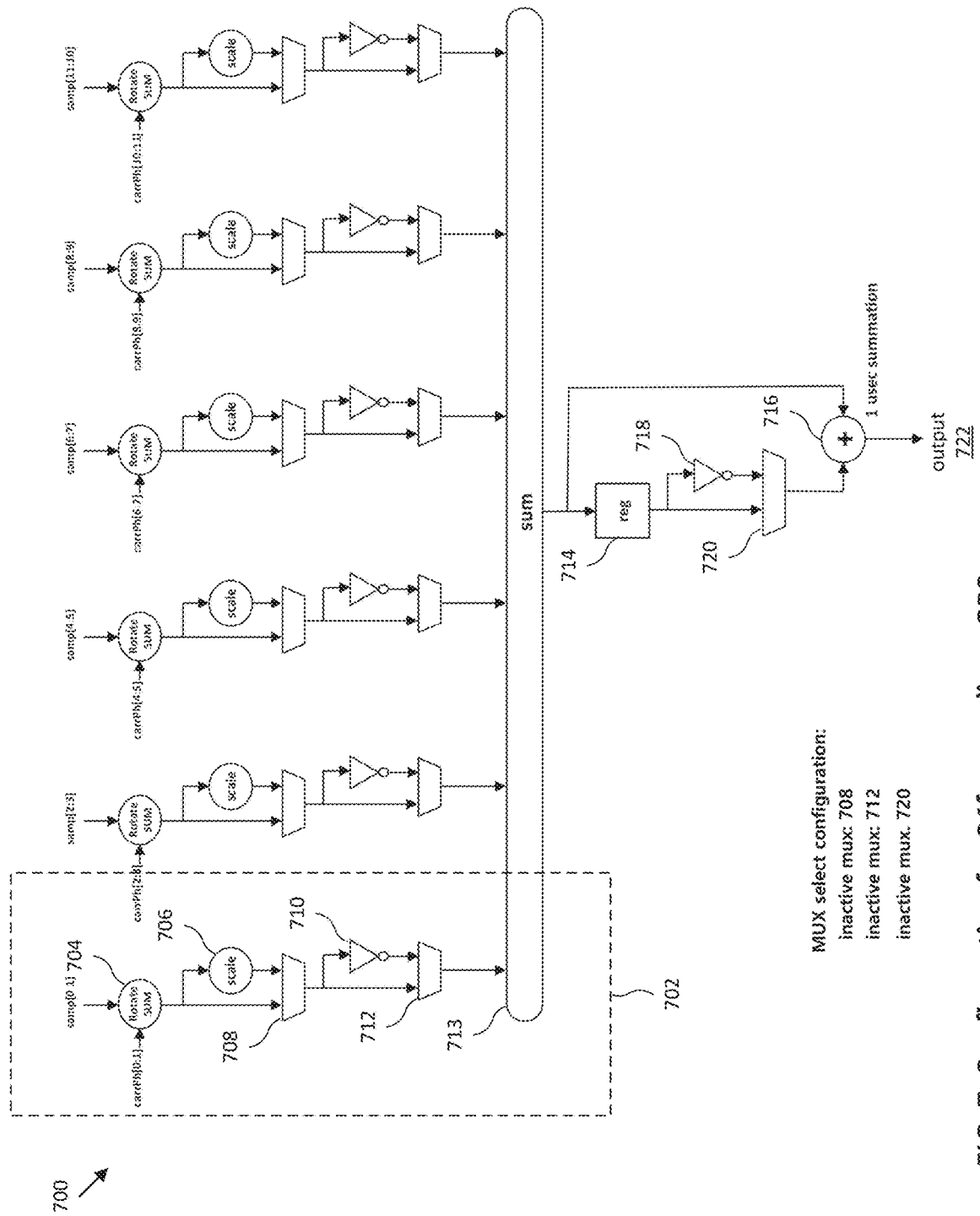
FIG. 7 illustrates a diagram of a CMF configuration for a GPS signal in 24fx sampling, according to an embodiment.

FIG. 7 illustrates a diagram of a CMF configuration for a GPS signal in 24fx sampling, according to an embodiment. The CMF 700 receives twelve samples (samp[0]-samp[11]). For ease of description, the first track 702 will be described, but the description applies to all tracks shown. The CMF 700 processes the signal through a rotate summation function 704 with a carrier phase inputs (carrPh[0,1]). The CMF 700 processes the output of the rotate function 704 through a scaling operation 706 and combines the output of the scaling operation 706 with the output of the rotate function 704 at 708. The CMF 700 processes the output of 708 through an inverter 710 and combines the output of 708 with the output of the inverter 710 at 712. The CMF 700 sums the output of each track at 713. The CMF 700 sends the summation to a reg block 714 and to an accumulator 716. The CMF 700 processes the output of the reg block 714 through an inverter 718 and combines the output of the reg block 714 with the output of the inverter 718 at 720. The CMF 700 accumulates the output of 720 with the summation to produce output signal 722. The scaling operation 706, the inverter 710 and the inverter 718 are unused for the design mode.

Figure 8:
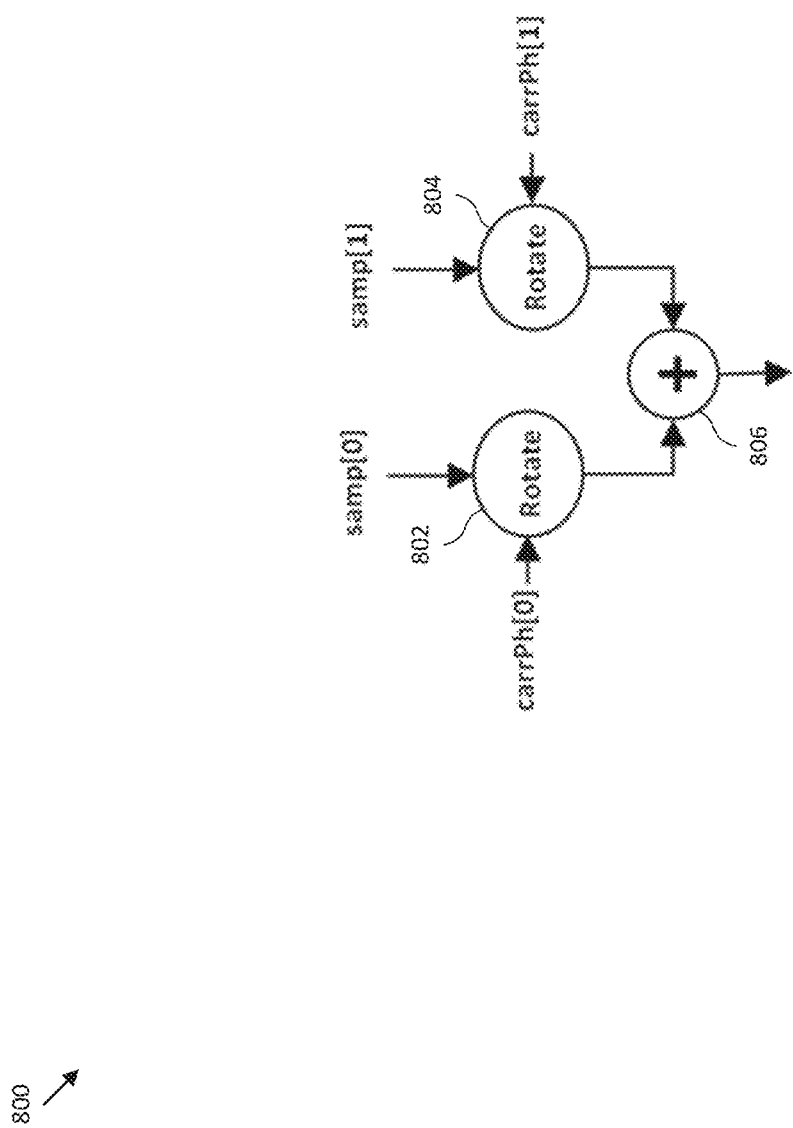
FIG. 8 illustrates a diagram of a rotate summation function, according to an embodiment.

FIG. 8 illustrates a diagram of a rotate summation function, according to an embodiment. The rotate summation function 800 includes a first rotate function 802 and a second rotate function 804. The first rotate function 802 receives a sample (samp[0]) and rotates it with a carrier phase signal (carrPh[0]). The second rotate function 804 receives a sample (samp[1]) and rotates with a carrier phase signal (carrPh[1]). The output of each rotation function are combined with the accumulator 806.

Figure 9:
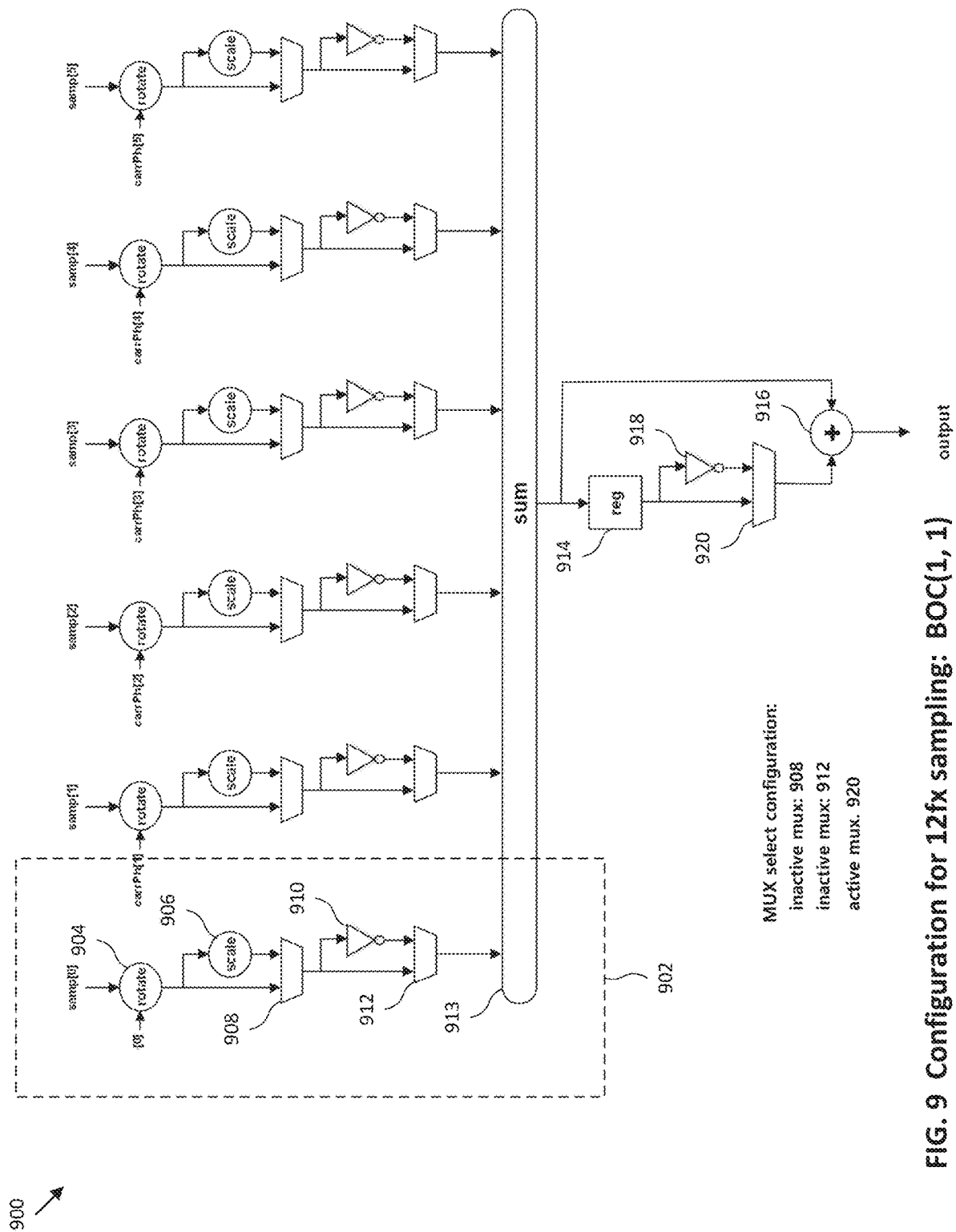
FIG. 9 illustrates a diagram of a CMF configuration for a BOC(1, 1) signal in 12fx sampling, according to an embodiment.

FIG. 9 illustrates a diagram of a CMF configuration for a BOC(1,1) signal in 12fx sampling, according to an embodiment. The CMF 900 receives six samples (samp[0]-samp[5]). For ease of description, the first track 902 will be described, but the description applies to all tracks shown. The CMF 900 processes the signal through a rotate function 904 with a carrier phase input (carrPh[0]). The CMF 900 processes the output of the rotate function 904 through a scaling operation 906 and combines the output of the scaling operation 906 with the output of the rotate function 904 at 908. The CMF 900 processes the output of 908 through an inverter 910 and combines the output of 908 with the output of the inverter 910 at 912. The CMF 900 sums the output of each track at 913. The CMF 900 sends the summation to a reg block 914 and to an accumulator 916. The CMF 900 processes the output of the reg block 914 through an inverter 918 and combines the output of the reg block 914 with the output of the inverter 918 at 920. The CMF 900 accumulates the output of 920 with the summation to produce output signal 922. The scaling operation 906, the inverter 910 and the connection between the reg block 914 and 920 are unused for the design mode.

Figure 10:
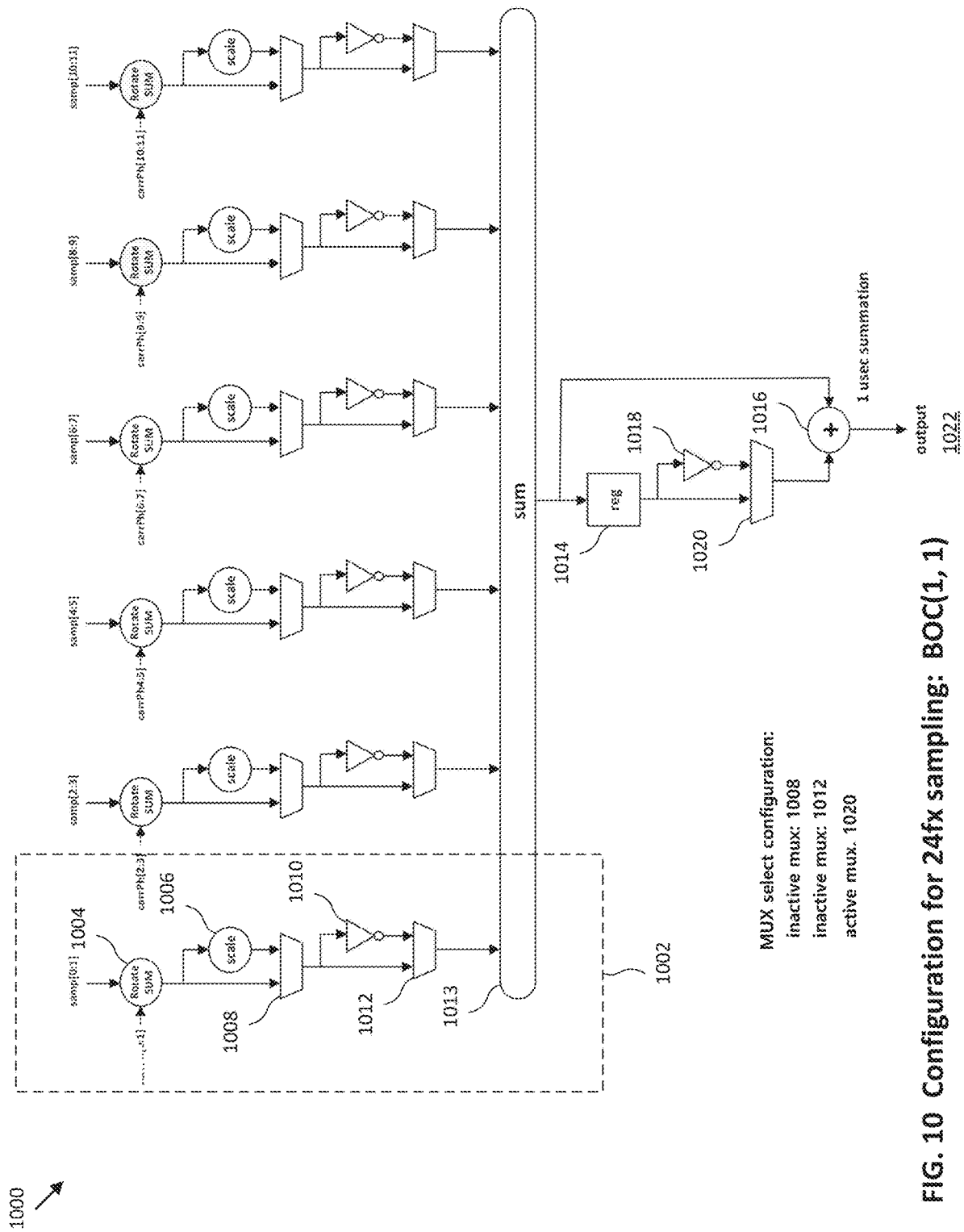
FIG. 10 illustrates a diagram of a CMF configuration for a BOC(1, 1) signal in 24fx sampling, according to an embodiment.

FIG. 10 illustrates a diagram of a CMF configuration for a BOC(1,1) signal in 24fx sampling, according to an embodiment. The CMF 1000 receives twelve samples (samp[0]-samp[11]). For ease of description, the first track 1002 will be described, but the description applies to all tracks shown. The CMF 1000 processes the signal through a rotate summation function 1004 with a carrier phase inputs (carrPh[0,1]). The CMF 1000 processes the output of the rotate function 1004 through a scaling operation 1006 and combines the output of the scaling operation 1006 with the output of the rotate function 1004 at 1008. The CMF 1000 processes the output of 1008 through an inverter 1010 and combines the output of 1008 with the output of the inverter 1010 at 1012. The CMF 1000 sums the output of each track at 1013. The CMF 1000 sends the summation to a reg block 1014 and to an accumulator 1016. The CMF 1000 processes the output of the reg block 1014 through an inverter 1018 and combines the output of the reg block 1014 with the output of the inverter 1018 at 1020. The CMF 1000 accumulates the output of 1020 with the summation to produce output signal 1022. The scaling operation 1006, the inverter 1010 and the connection between the reg block 1014 and 1020 are unused for the design mode.

Figure 11:
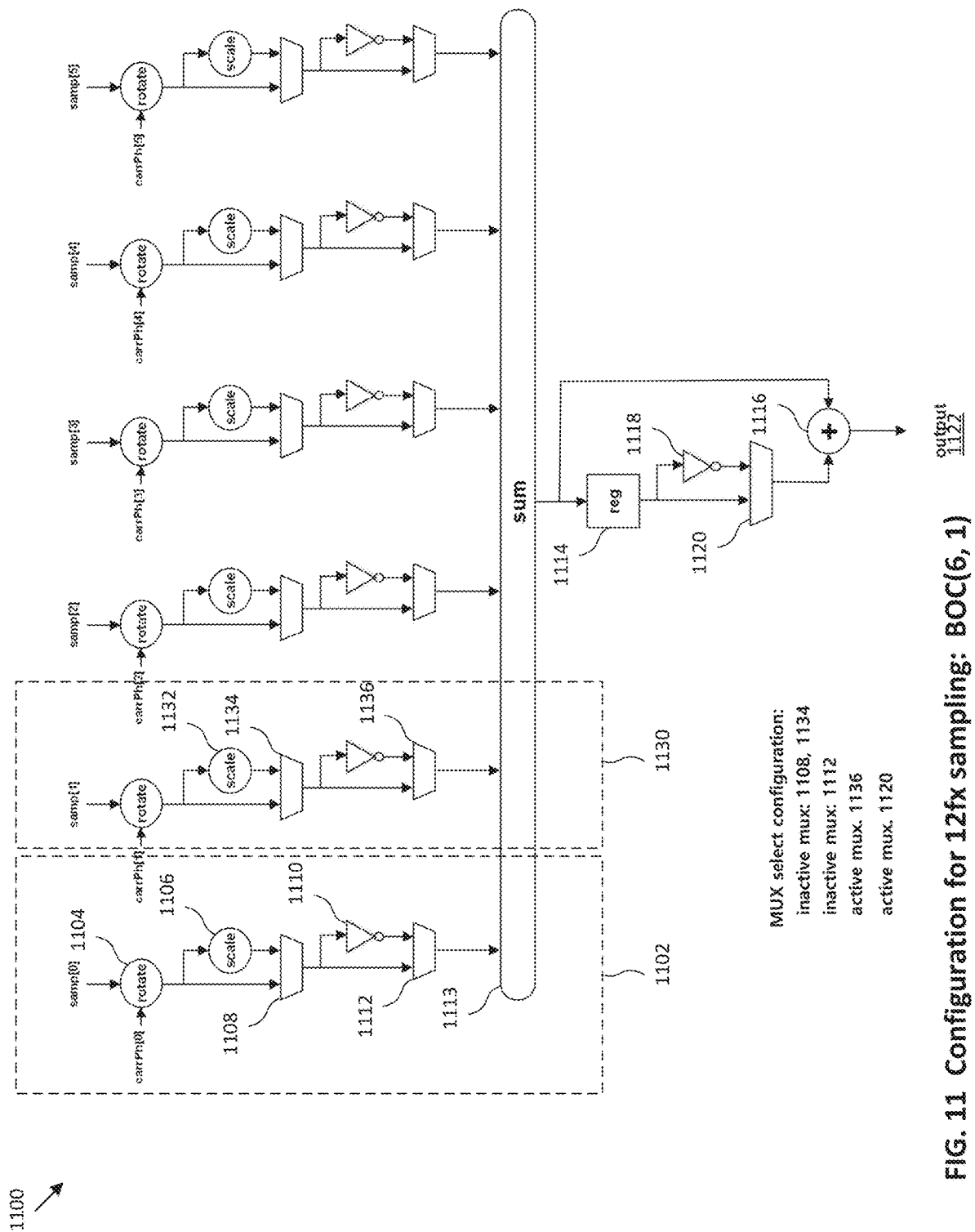
FIG. 11 illustrates a diagram of a CMF configuration for a BOC(6, 1) signal in 12fx sampling, according to an embodiment.

FIG. 11 illustrates a diagram of a CMF configuration for a BOC(6,1) signal in 12fx sampling, according to an embodiment. The CMF 1100 receives six samples (samp[0]-samp[5]). For ease of description, the first track 1102 will be described, but the description applies to all tracks shown. The CMF 1100 processes the signal through a rotate function 1104 with a carrier phase input (carrPh[0]). The CMF 1100 processes the output of the rotate function 1104 through a scaling operation 1106 and combines the output of the scaling operation 1106 with the output of the rotate function 1104 at 1108. The CMF 1100 processes the output of 1108 through an inverter 1110 and combines the output of 1108 with the output of the inverter 1110 at 1112. The CMF 1100 sums the output of each track at 1113. The CMF 1100 sends the summation to a reg block 1114 and to an accumulator 1116. The CMF 1100 processes the output of the reg block 1114 through an inverter 1118 and combines the output of the reg block 1114 with the output of the inverter 1118 at 1120. The CMF 1100 accumulates the output of 1120 with the summation to produce output signal 1122. The scaling operation 1106, the inverter 1110 and the connection between the reg block 1114 and 1120, as well as the scaling operation 1132 and the connection between 1134 and 1136 in the second track 1130 are unused for the design mode. The unused operations for the design mode are similar for each pair of tracks.

Figure 12:
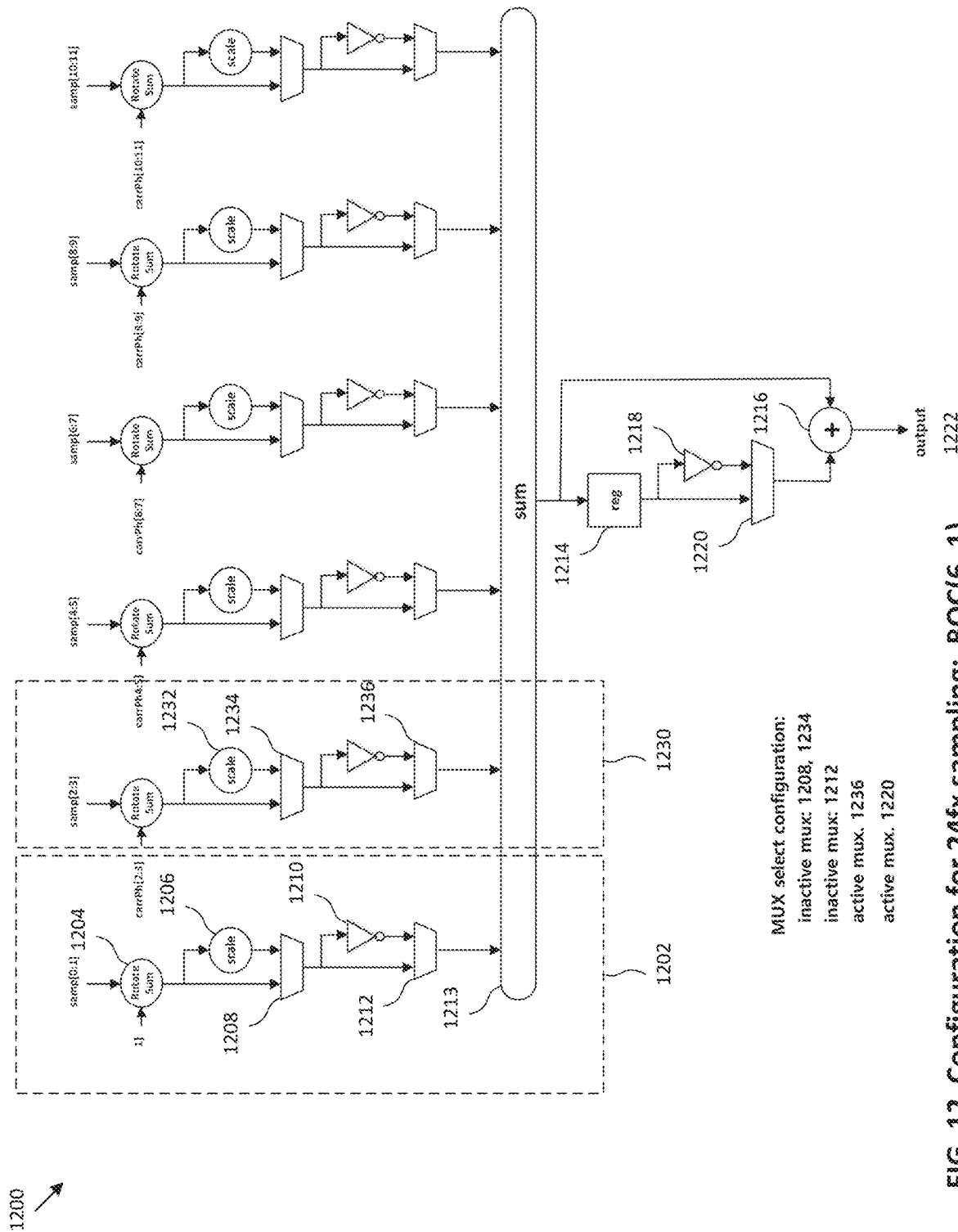
FIG. 12 illustrates a diagram of a CMF configuration for a BOC(6, 1) signal in 24fx sampling, according to an embodiment.
Figure 13:
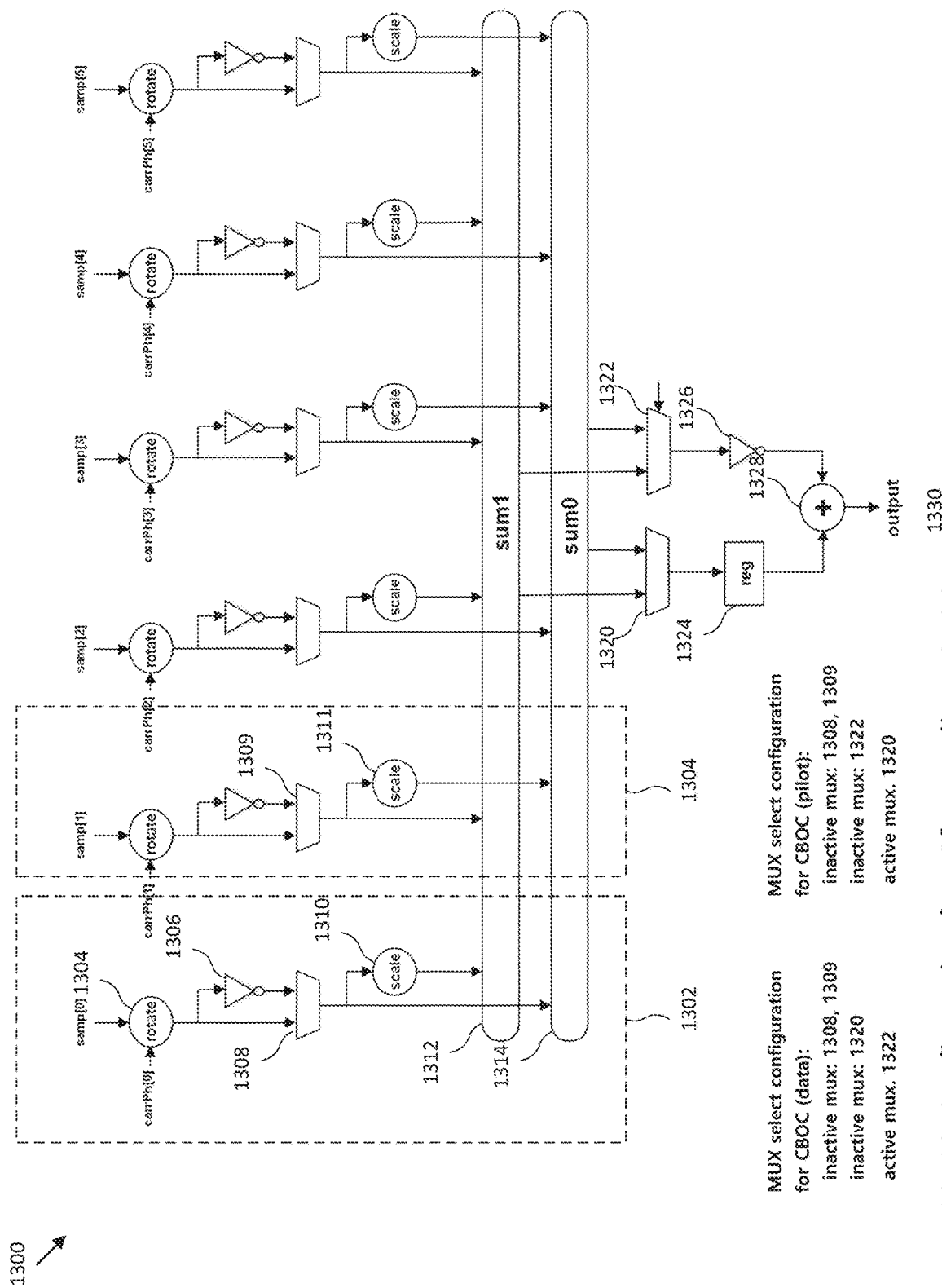
FIG. 13 illustrates a diagram of a CMF configuration for a composite BOC (CBOC) signal in 12fx sampling, according to an embodiment.

FIG. 12 illustrates a diagram of a CMF configuration for a BOC(6, 1) signal in 24fx sampling, according to an embodiment. The CMF 1200 receives twelve samples (samp[0]-samp[11]). For ease of description, the first track 1202 will be described, but the description applies to all tracks shown. The CMF 1200 processes the signal through a rotate summation function 1204 with a carrier phase inputs (carrPh[0,1]). The CMF 1200 processes the output of the rotate function 1204 through a scaling operation 1206 and combines the output of the scaling operation 1206 with the output of the rotate function 1204 at 1208. The CMF 1200 processes the output of 1208 through an inverter 1210 and combines the output of 1208 with the output of the inverter 1210 at 1212. The CMF 1200 sums the output of each track at 1213. The CMF 1200 sends the summation to a reg block 1214 and to an accumulator 1216. The CMF 1200 processes the output of the reg block 1214 through an inverter 1218 and combines the output of the reg block 1214 with the output of the inverter 1218 at 1220. The CMF 1200 accumulates the output of 1220 with the summation to produce output signal 1222. The scaling operation 1206, the inverter 1210 and the connection between the reg block 1214 and 1220, as well as the scaling operation 1232 and the connection between 1234 and 1236 in the second track 1230 are unused for the design mode. The unused operations for the design mode are similar for each pair of tracks FIG. 13 illustrates a diagram of a CMF configuration for a CBOC signal in 12fx sampling, according to an embodiment. The CMF 1300 receives six samples (samp[0]-samp[5]). For ease of description, the first track 1302 and the second track 1303 will be described, but the description applies to all track pairs shown. The CMF 1300 processes the signal through a rotate function 1304 with a carrier phase input (carrPh[0,1]). The CMF 1300 processes the output of the rotate function 1304 through an inverter 1306 and combines the output of the rotate function 1304 and the out of the inverter 1306 at 1308. The CMF 1300 processes the output of 1309 through a scaling function 1311. The CMF 1300 processes the output of 1309 through a first summation function 1312 and the output of the scaling function 1311 through a second summation function 1314. The second track 1303 processes the sample (samp[1]) similarly to the first track 1302. However, in the second track 1303, the CMF 1300 processes the output of 1316 in the first summation function 1312 and the output of the scaling function 1318 through the second summation function 1314. The output of the first summation function 1312 and the second summation function 1314 are combined at 1320 and 1322. The CMF 1300 processes the output of 1320 through a reg block 1324 and the output of 1322 through an inverter 1326.

The CMF 1300 accumulates the output of the reg block 1324 and the output of the inverter 1326 with the accumulator 1328 to produce an output signal 1330. The inverter 1306 is unused in design mode. For CBOC data, sum1 is the second input of 1320 and sum0 is the first input to 1322. For CBOC pilot, sum1 is the first input of 1320 and sum0 is the second input to 1322. For CBOC pilot, 1308, 1309 and 1322 are inactive and 1320 is active.

Figure 14:
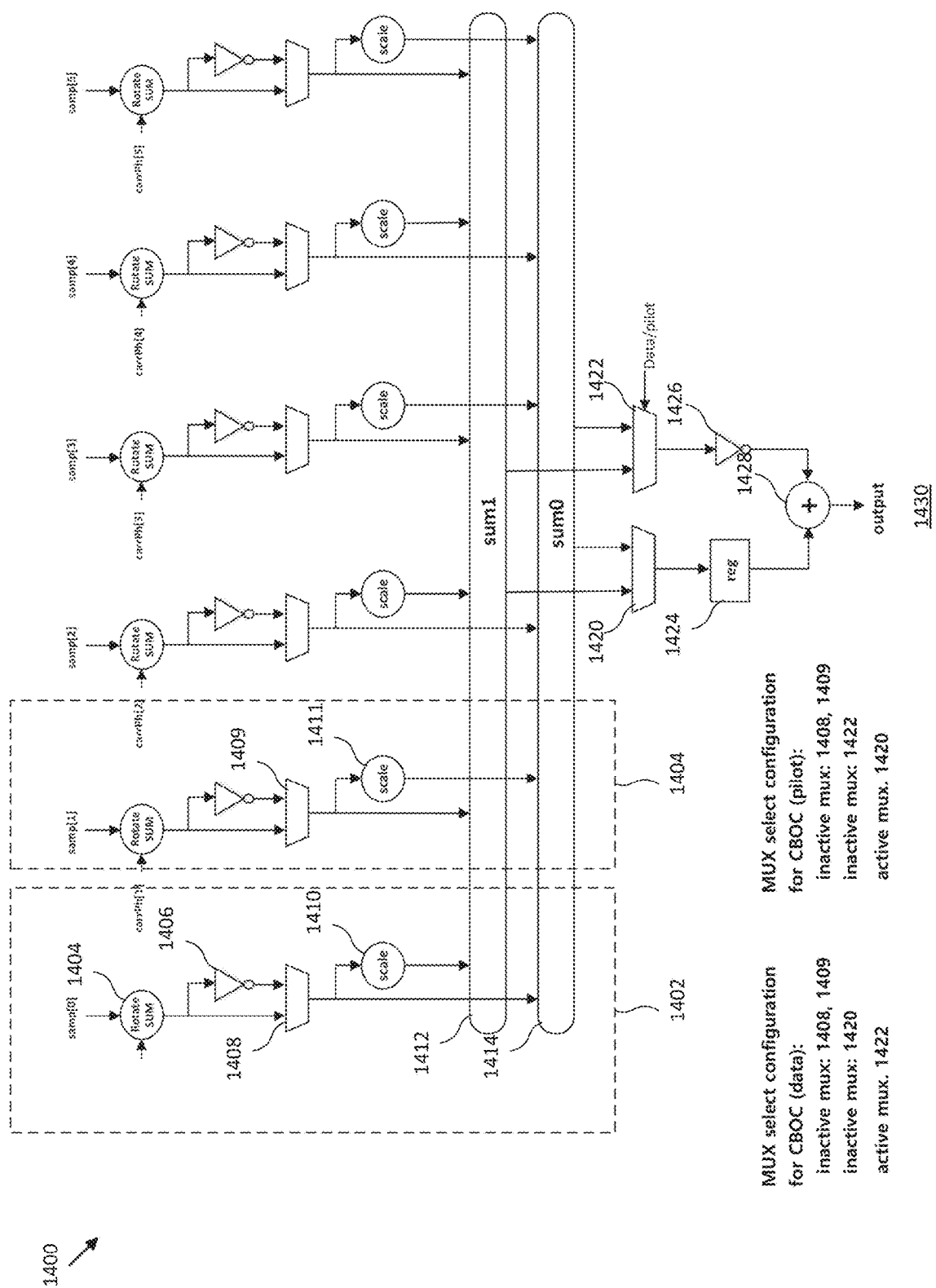
FIG. 14 illustrates a diagram of a CMF configuration for a CBOC signal in 24fx sampling, according to an embodiment.

FIG. 14 illustrates a diagram of a CMF configuration for a CBOC signal in 24fx sampling, according to an embodiment. The CMF 1400 receives twelve samples (samp[0]-samp[11]). For ease of description, the first track 1402 and the second track 1403 will be described, but the description applies to all track pairs shown. The CMF 1400 processes the signal (samp[0,1]) through a rotate summation function 1404 with a carrier phase input (carrPh[0,1]). The CMF 1400 processes the output of the rotate summation function 1404 through an inverter 1406 and combines the output of the rotate summation function 1404 and the out of the inverter 1406 at 1408. The CMF 1400 processes the output of 1408 through a scaling function 1410. The CMF 1400 processes the output of 1408 through a first summation function 1412 and the output of the scaling function 1410 through a second summation function 1414. The second track 1403 processes the samples (samp[2,3]) similarly to the first track 1402. However, in the second track 1403, the CMF 1400 processes the output of 1409 in the first summation function 1412 and the output of the scaling function 1411 through the second summation function 1414. The output of the first summation function 1412 and the second summation function 1414 are combined at 1420 and 1422. The CMF 1400 processes the output of 1420 through a reg block 1424 and the output of 1422 through an inverter 1426. The CMF 1400 accumulates the output of the reg block 1424 and the output of the inverter 1426 with the accumulator 1428 to produce an output signal 1430. The inverter 1406 is unused in design mode. For CBOC data, sum1 is the first input of 1422 and sum0 is the second input to 1420. For CBOC pilot, sum1 is the first input of 1420 and sum0 is the second input to 1422. For CBOC pilot, 1408, 1409 and 1422 are inactive, and 1422 is active.

A single output stream of samples is produced with samples separated from each other by one microsecond (usec). It is desirable to produce multiple concurrent streams of samples, with each stream containing samples on usec apart, but the streams offset from each other by a fraction of a usec. This allows correlation against a reference code to provide correlation taps that are a fraction of a usec apart.

Figure 15:
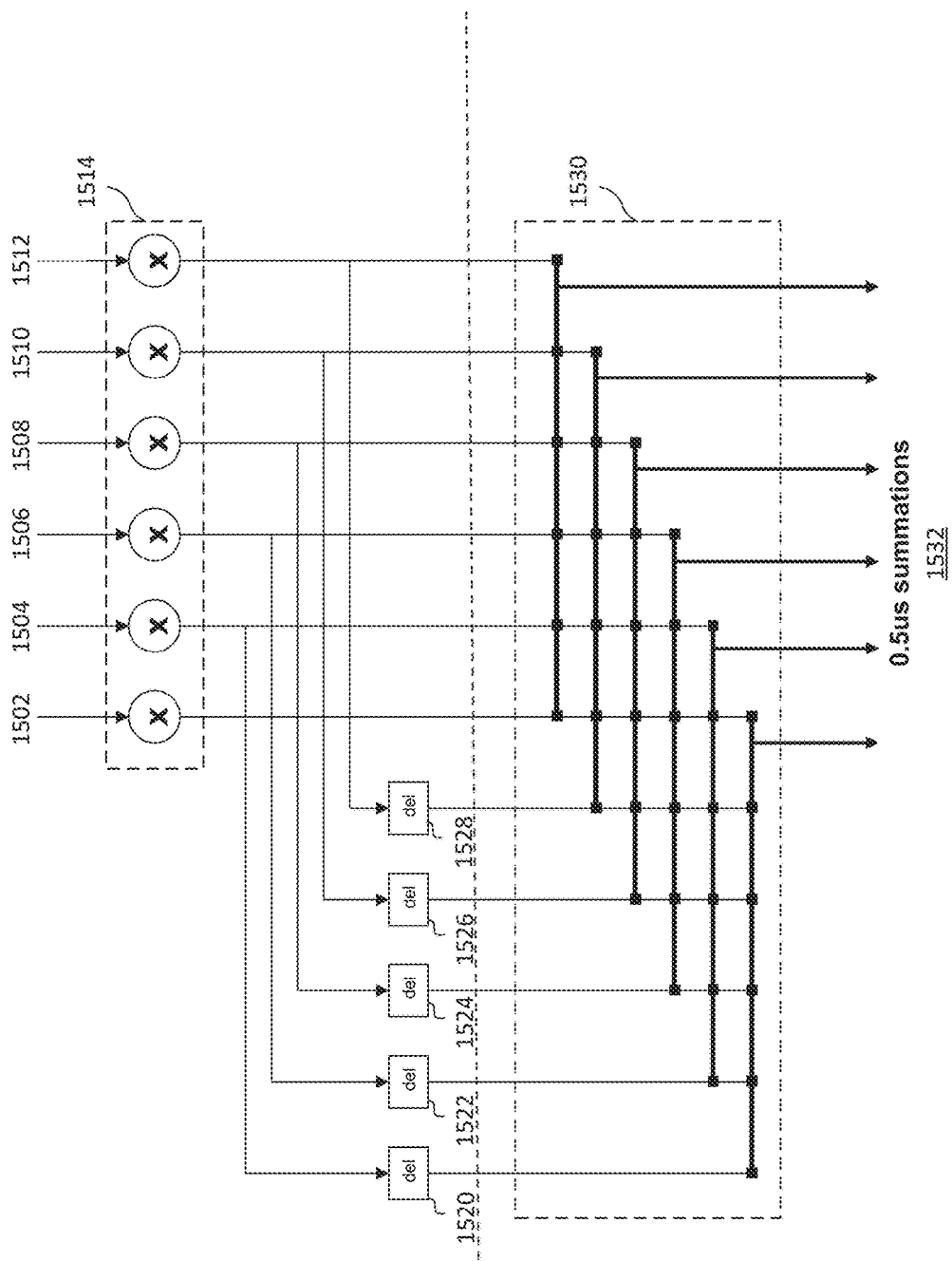
FIG. 15 illustrates a diagram of multiple stream CMF in GPS and BOC(1, 1), according to an embodiment.

FIG. 15 illustrates a diagram of multiple stream CMF in GPS and BOC(1,1), according to an embodiment. For WCCE, there are 6 outputs according to a $\frac{1}{12}$ chip separation. For HRCE, there are 12 outputs according to a $\frac{1}{24}$ chip separation. The logic produced multiple outputs of the same functionality using delay chains. Six input samples 1502-1512 are rotated at 1514 with their corresponding carrier phases. Samples 1504-1512 are processed at corresponding delay functions 1520-1528 and are summed at 1530 to produce $\frac{1}{2}$ chip summations 1532. In GPS, the delayed $\frac{1}{2}$ chip summations are added to the $\frac{1}{2}$ chip summations to produce the full 1 us chip summation. In BOC(1, 1), the delayed $\frac{1}{2}$ chip summations are subtracted from the $\frac{1}{2}$ chip summations to produce the full 1 us chip summation. Delay chains are used to created six delayed copies (twelve for a $\frac{1}{24}$ chip spaced example) of the full chip summations.

Figure 16:
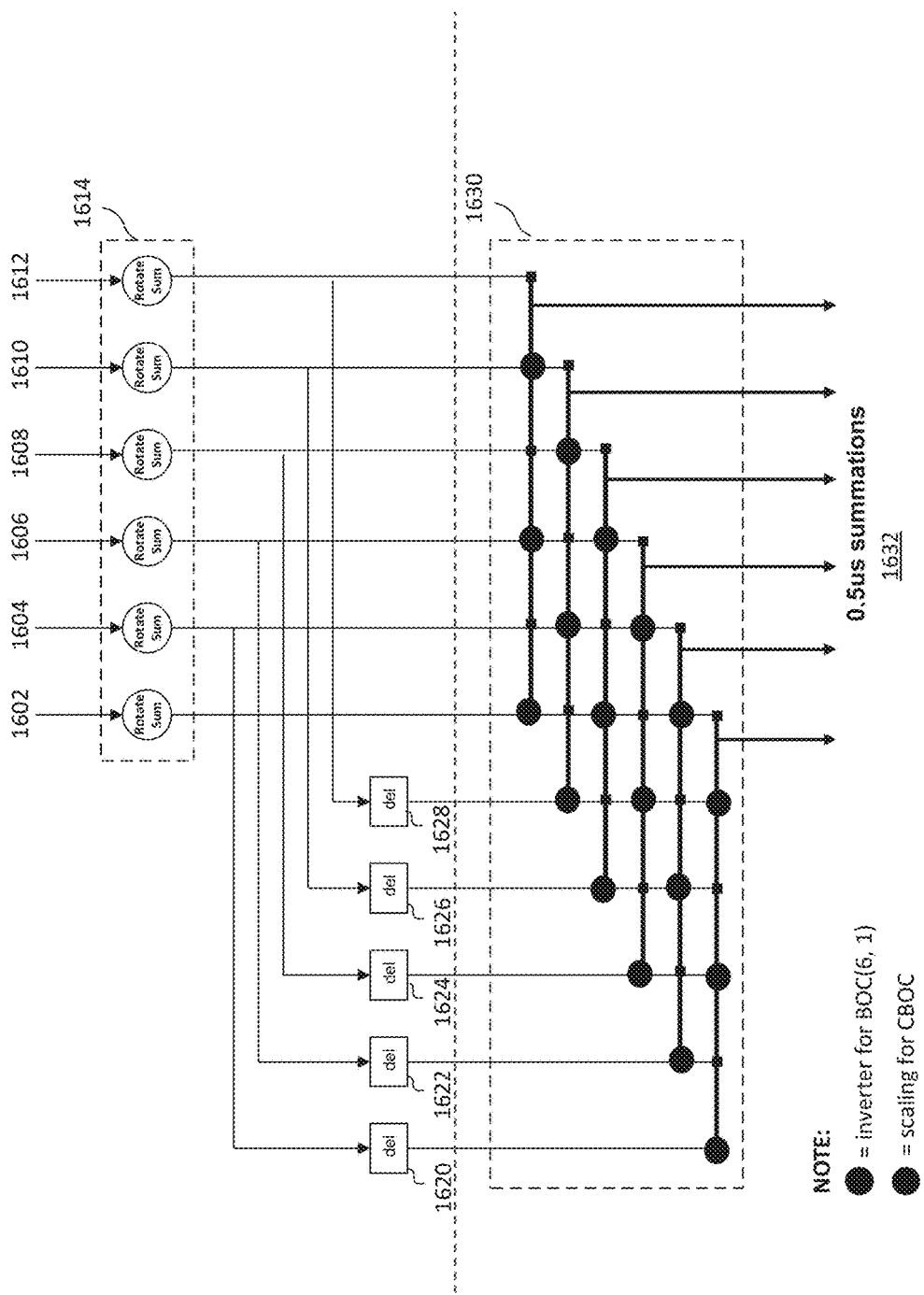
FIG. 16 illustrates a diagram of multiple stream CMF in BOC(6, 1) and CBOC, according to an embodiment.

FIG. 16 illustrates a diagram of multiple stream CMF in BOC(6,1) and CBOC, according to an embodiment. FIG. 16 shows the CMF functions used in HRCE and WCCE for BOC(6, 1) and CBOC with 1/12 chip spacing. Six input samples 1602-1612 are rotated at 1614 with their corresponding carrier phases. Samples 1604-1612 are processed at corresponding delay functions 1620-1628. The six rotated outputs are alternately inverted (scaled instead of inverted for CBOC) with the outputs of delay functions 1620-1628 as represented by the alternating squares and circles at 1630 and are then summed to produce the chip summations 1632. The delayed ½ chip summations are subtracted from the ½ chip summations to produce the full 1 us chip summation. The delay chains 1620-1628 are used to create six delayed copies of the full chip summations. With 1/24 chip spacing (not shown), twelve input samples are rotated with their corresponding carrier phases. Adjacent pairs of the rotated samples are added together. The six added outputs are alternatively inverted (scaled instead of inverted for CBOC) and then summed together to produce ½ chip summations.

Figure 17:
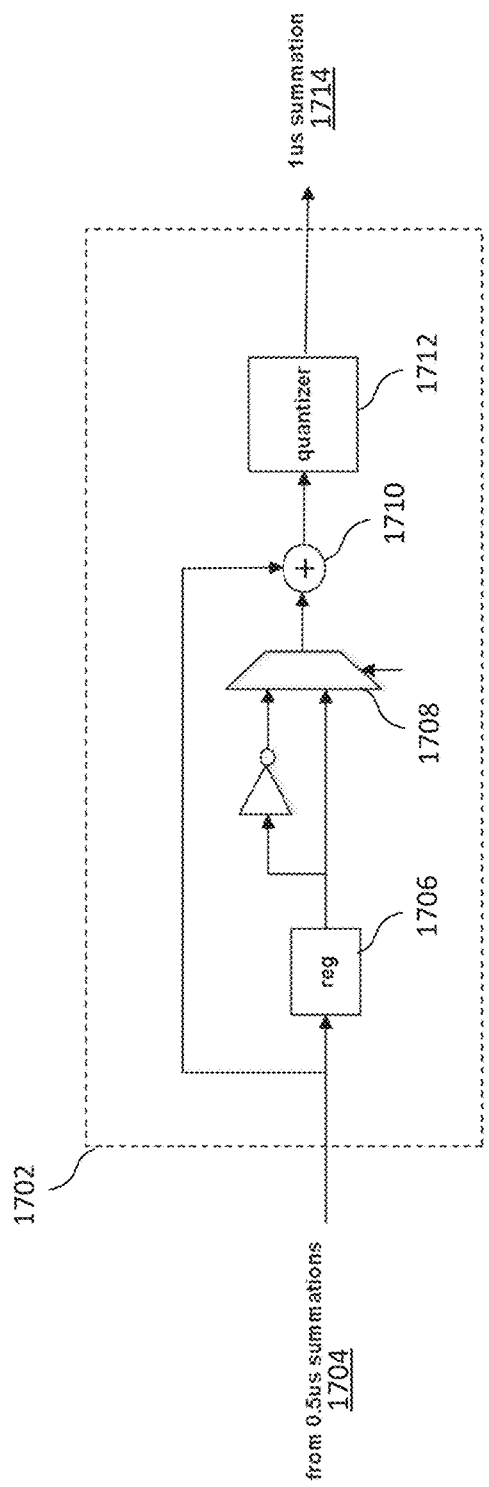
FIG. 17 illustrates a diagram of full chip summation of two ½ chips, according to an embodiment.

FIG. 17 illustrates a diagram of full chip summation of two ½ chips, according to an embodiment. The circuit 1702 receives ½ chip summations 1704 and processes the ½ chip summation through a reg block 1706. The output of the reg block 1706 is processed through a BOC selection block 1708 for inversion selection. The summation 1704 is added at 1710 with the output of the BOC selection block 1708, and the result is passed to a quantizer 1712. The output of the circuit 1702 is the 1 us summation 1714. For GPS, the delayed ½ chip summations are added to the ½ chip summations to produce the full 1 us chip summation. For BOC(1, 1), BOC(6, 1) and CBOC, the delayed ½ chip summations are subtracted from the ½ chip summations to produce the full 1 us chip summation.

Figure 18:
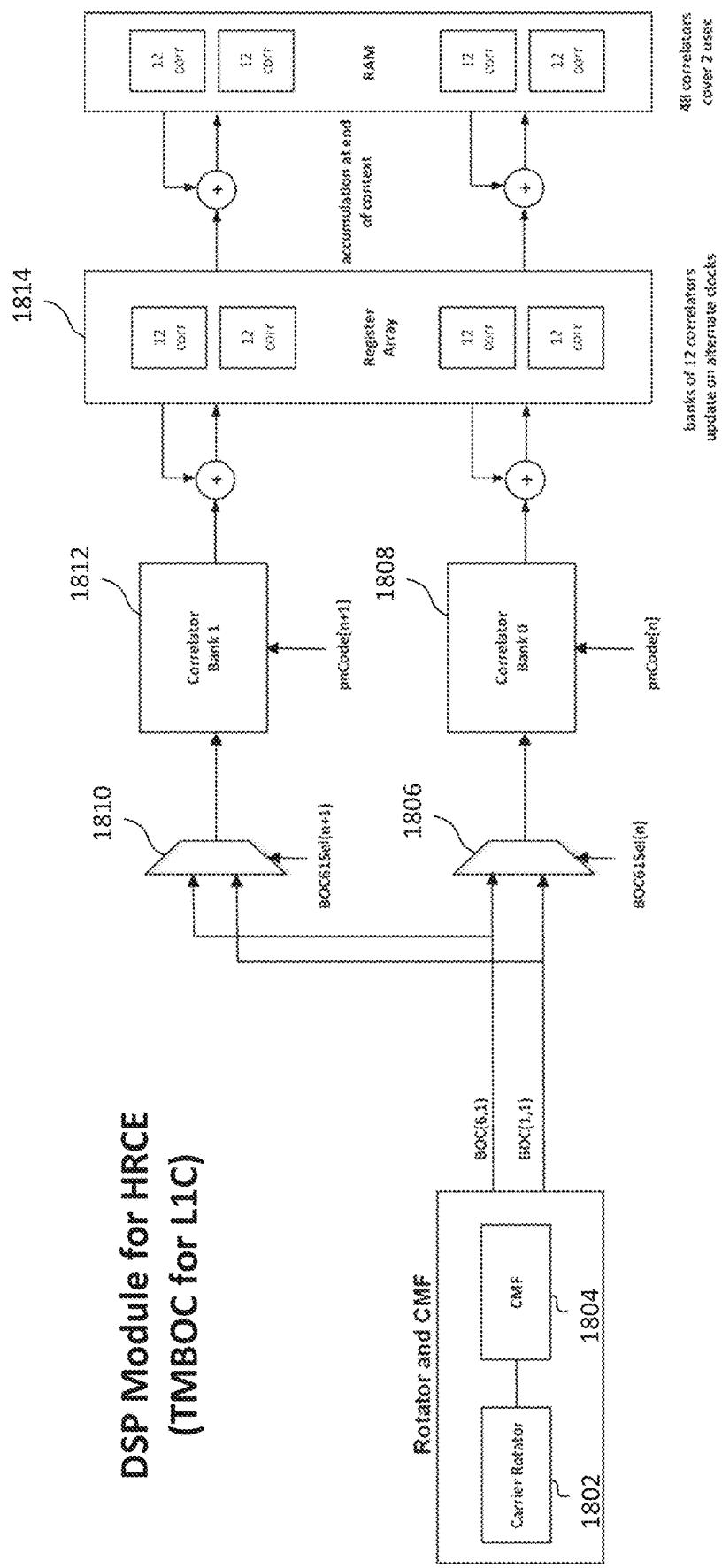
FIG. 18 illustrates a diagram of a high resolution correlation engine (HRCE), according to an embodiment.

FIG. 18 illustrates a diagram of an HRCE, according to an embodiment. The HRCE corresponds to TMBOC. The HRCE 1800 includes a carrier rotator 1802 and a CMF 1804. The CMF 1804 outputs a BOC(1, 1) signal and a BOC(6, 1) signal. The system processes the output of the CMF 1804 through a BOC selection block 1806 corresponding to an n selection. The system processes the selection of the BOC selection block 1806 with a correlator bank 1808 that correlates the selection from the BOC selection block 1806 with a PN code for the n selection. The system also processes the output of the CMF 1804 through a BOC selection block 1810 for an n+1 selection. The system processes the selection of the BOC selection block 1810 with a correlator bank 1812 that correlates the selection of the BOC selection block 1810 with a pseudo node (PN) code for the n+1 selection. The system processes the outputs of the correlator banks 1808 and 1812 through a register array 1814. Samples are selected on code chip by code chip basis between BOC(1,1) and BOC(6,1). The BOC(1,1)/BOC(6,1) selection is time aligned with the generated PN code. The design is enabled to achieve optimal system performances using both BOC(1,1) signal and BOC(6,1) signal. Compared to BOC (1,1) based designs it allows a gain in C/N0 of about 1.12 dB.

Figure 19:
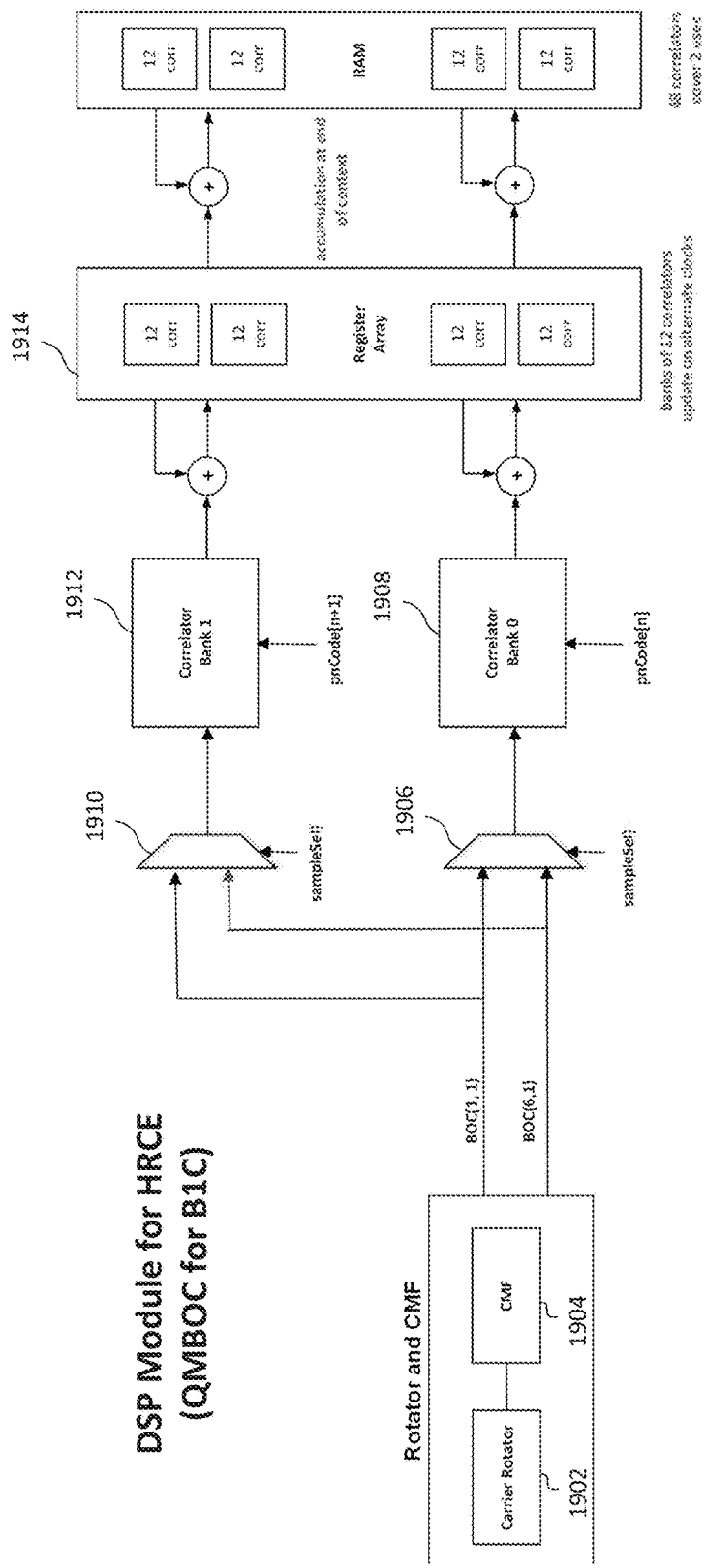
FIG. 19 illustrates a diagram of an HRCE, according to an embodiment.

FIG. 19 illustrates a diagram of an HRCE, according to an embodiment. The HRCE corresponds to QMBOC. The HRCE 1900 includes a carrier rotator 1902 and a CMF 1904. The CMF 1904 outputs a BOC(1, 1) signal and a BOC(6, 1) signal. The system processes the output of the CMF 1904 through a BOC selection block 1906 corresponding to a sample selection. The system processes the selection of the BOC selection block 1906 with a correlator bank 1908 that correlates the selection from the BOC selection block 1906 with a PN code for the n selection. The system also processes the output of the CMF 1904 through a BOC selection block 1910 for a sample selection. The system processes the selection of the BOC selection block 1910 with a correlator bank 1912 that correlates the selection of the BOC selection block 1910 with a PN code for the n+1 selection. The system processes the outputs of the correlator banks 1910 and 1912 through a register array 1914. The QMBOC signal is handled as an example shown using 2 channels, one for BOC(1,1) and one for BOC(6,1). The combination produces the complex IQ correlation. Compared to BOC(1,1) based designs it allows a gain in C/N0 of about 0.56 dB.

Figure 20:
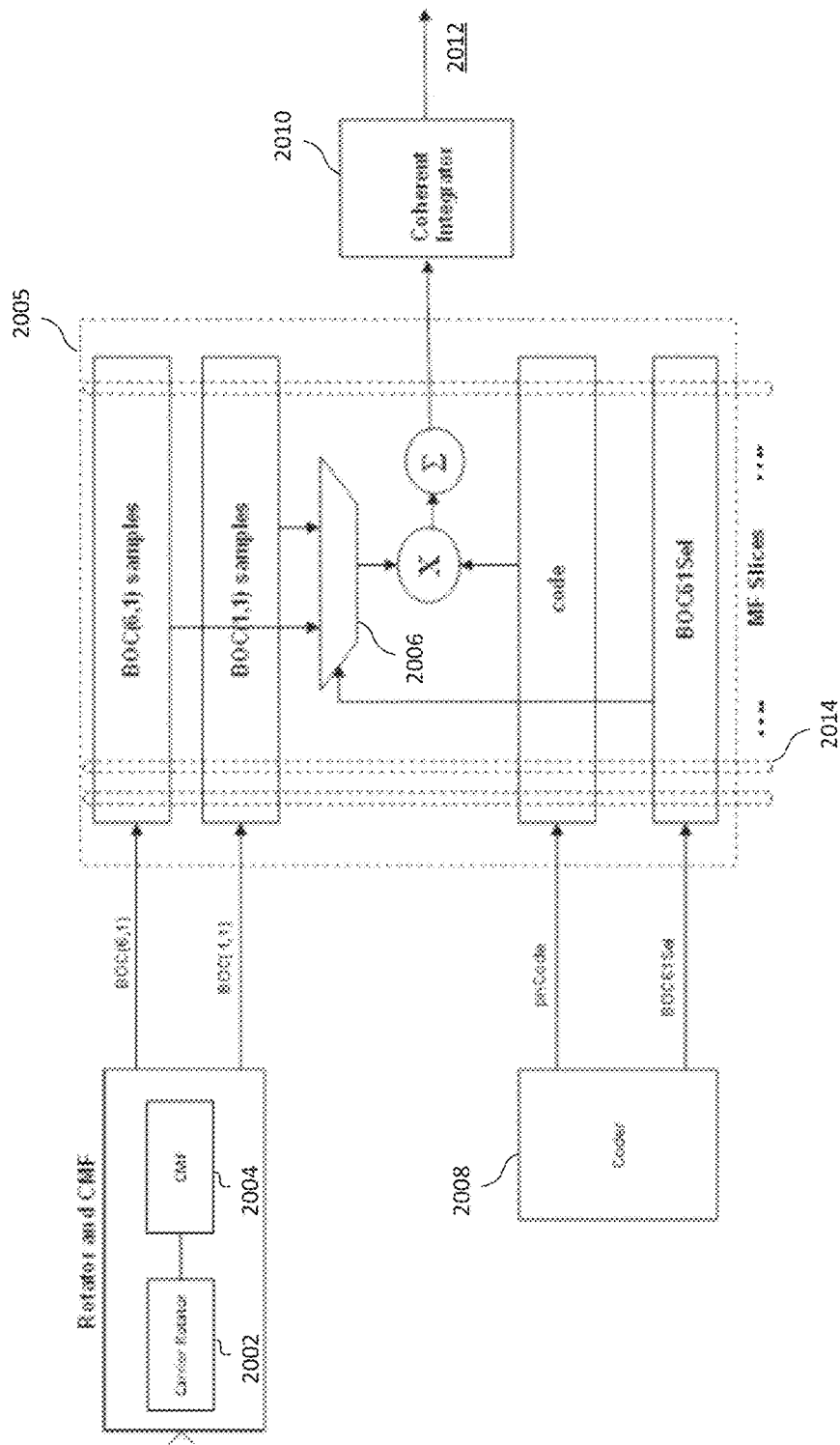
FIG. 20 illustrates a diagram of a widely configurable correlation engine (WCCE), according to an embodiment.

FIG. 20 illustrates a diagram of a WCCE, according to an embodiment. The WCCE corresponds to TMBOC. The WCCE 2000 includes a carrier rotator 2002, a CMF 2004 and a matched filter (MF) 2005. The CMF 2004 outputs a BOC(6, 1) sample and a BOC(1, 1) sample. The system processes the samples at a BOC selection block 2006. Based on a BOC(6, 1) selection output of a coder 2008, the system selects a sample with the BOC selection block 2006. The selected sample is then processed with a PN code output from the coder 2008, and by coherent integration 2010, the system produces an output 2012. The WCCE 2000 shown is illustrated for the WCCE architecture for TMBOC with 12fx sampling. TMBOC is handled by the CMF 2004 producing both BOC(1,1) and BOC(6,1) into concurrent sample delay chains. Samples are selected on slice by slice basis between BOC(1,1) and BOC(6,1). The BOC(1,1)/BOC(6,1) selection is time aligned with the generated PN code. Compared to BOC(1,1) based designs it allows a gain in C/N0 of about 1.12 dB. The system includes multiple MF slices (e.g., 2014).

Figure 21:
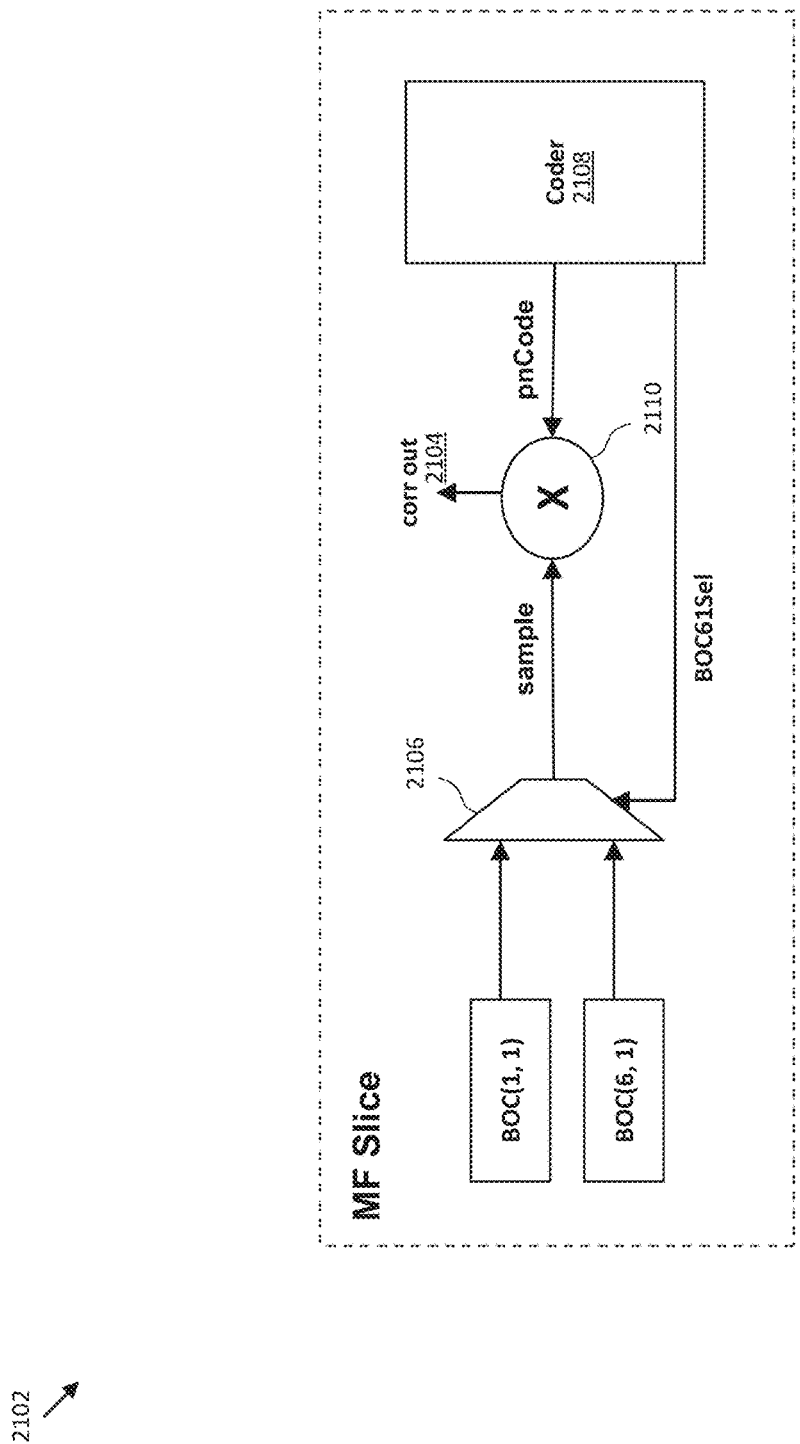
FIG. 21 illustrates a diagram of a matched filter slice in TMBOC, according to an embodiment.

FIG. 21 illustrates a diagram of a matched filter slice in TMBOC, according to an embodiment. The MF slice 2102 includes a correlation output 2104. The BOC selection block 2106 selects a BOC sample based on a BOC(6, 1) selection from a coder 2108. The selected sample is then accumulated at 2110 with a PN code from the coder 2108 to produce the correlation output 2104.

Figure 22:
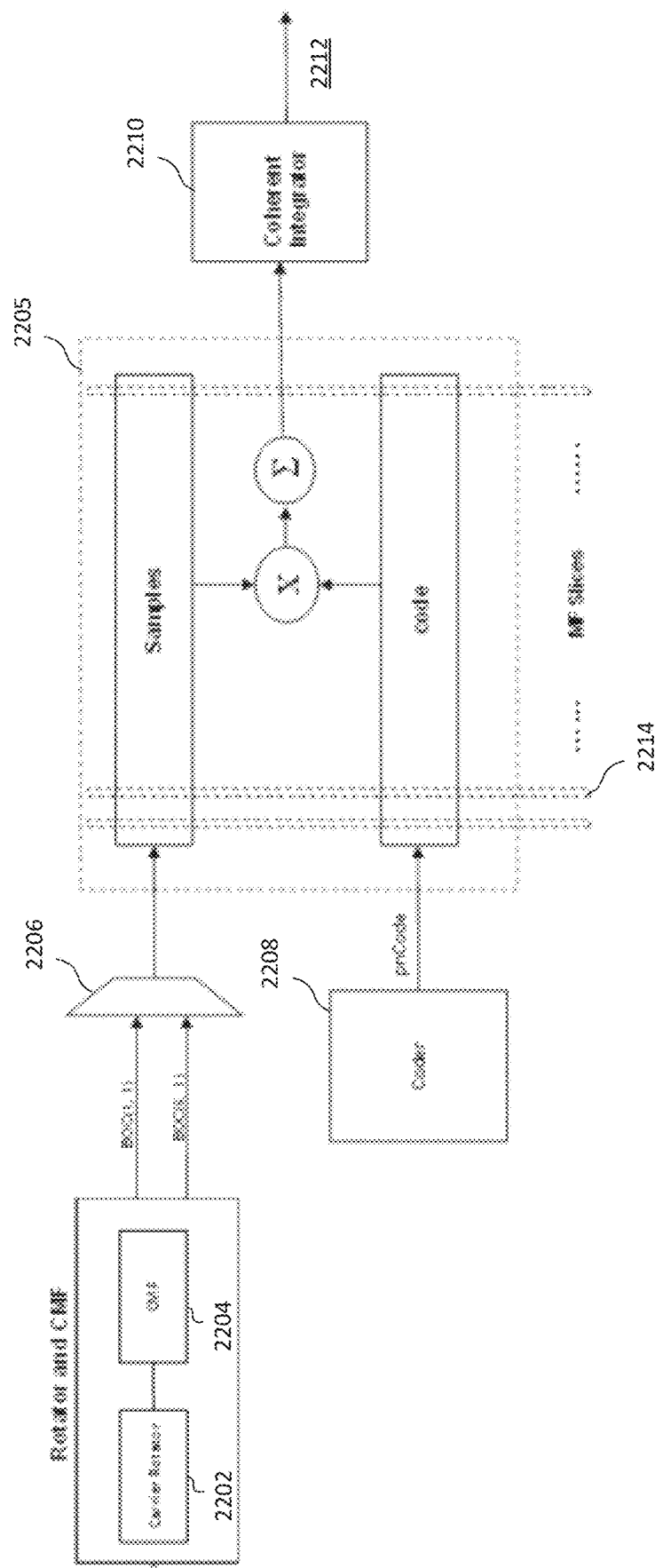
FIG. 22 illustrates a diagram of a WCCE, according to an embodiment.

FIG. 22 illustrates a diagram of a WCCE, according to an embodiment. The WCCE corresponds to QMBOC. The WCCE 2200 includes a carrier rotator 2202, a CMF 2204 and an MF 2205. The CMF 2204 outputs a BOC(6, 1) sample and a BOC(1, 1) sample. The system processes the samples at a BOC selection block 2206. The selected sample is then processed with a PN code output from the coder 2208, and by coherent integration 2210, the system produces an output 2212. The WCCE 2200 shown is illustrated for the WCCE architecture for QMBOC with 12fx sampling. It also works for legacy GPS and Galileo designs. For QMBOC, it is shown by using 2 channels as an example, one for BOC(1,1) and one for BOC(6,1). The combination produces the complex IQ correlation. Compared to BOC(1,1) based designs it allows a gain in C/N0 of about 0.56 dB. The WCCE 2200 also gives a unified design for both legacy signals and new BOC signal combinations. The system includes multiple matched filter (MF) slices (e.g., 2214).

Figure 23:
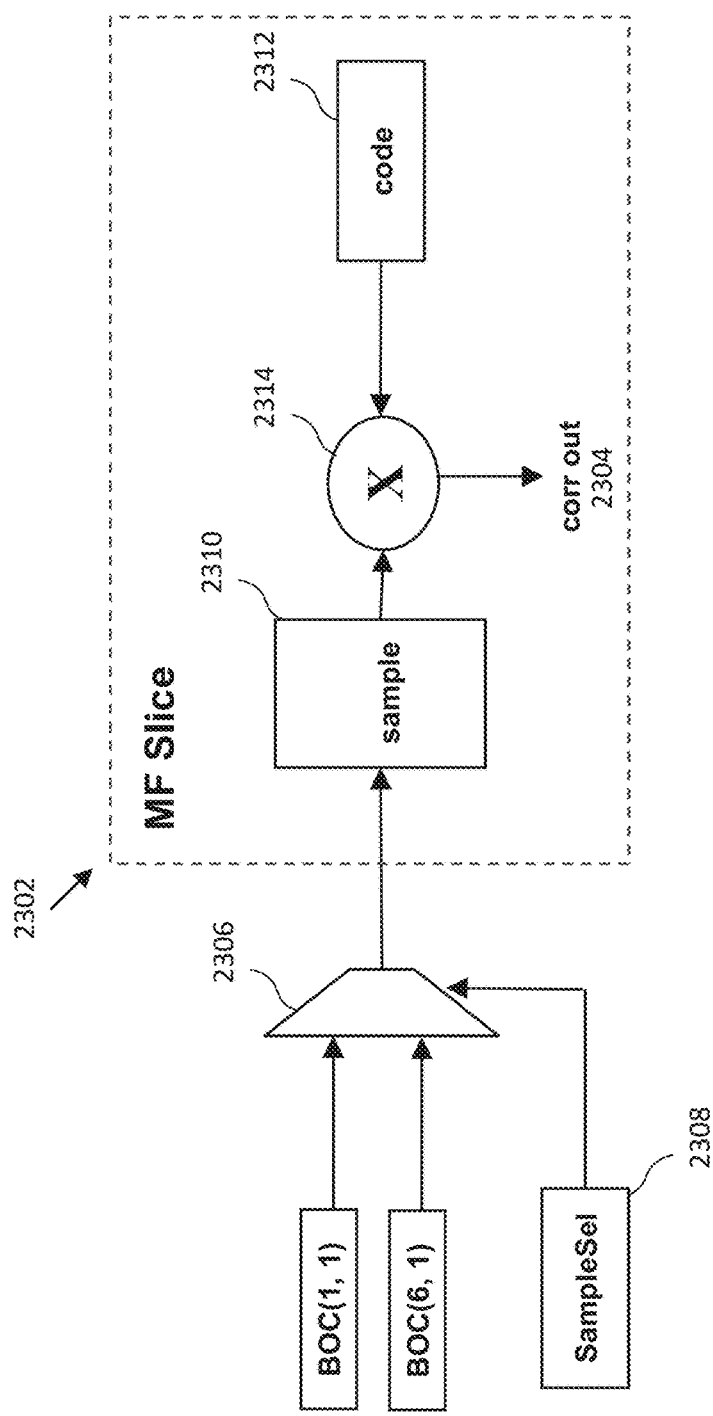
FIG. 23 illustrates a diagram of a matched filter slice in QMBOC, according to an embodiment.

FIG. 23 illustrates a diagram of a matched filter slice in QMBOC, according to an embodiment. The MF slice 2302 includes a correlation output 2304. A sample is selected at a BOC selection block 2306 based on an input sample selection 2308. The selected sample 2310 is then accumulated at 2314 with a PN code output from a coder 2312 to produce the correlation output 2304.

Figure 24:
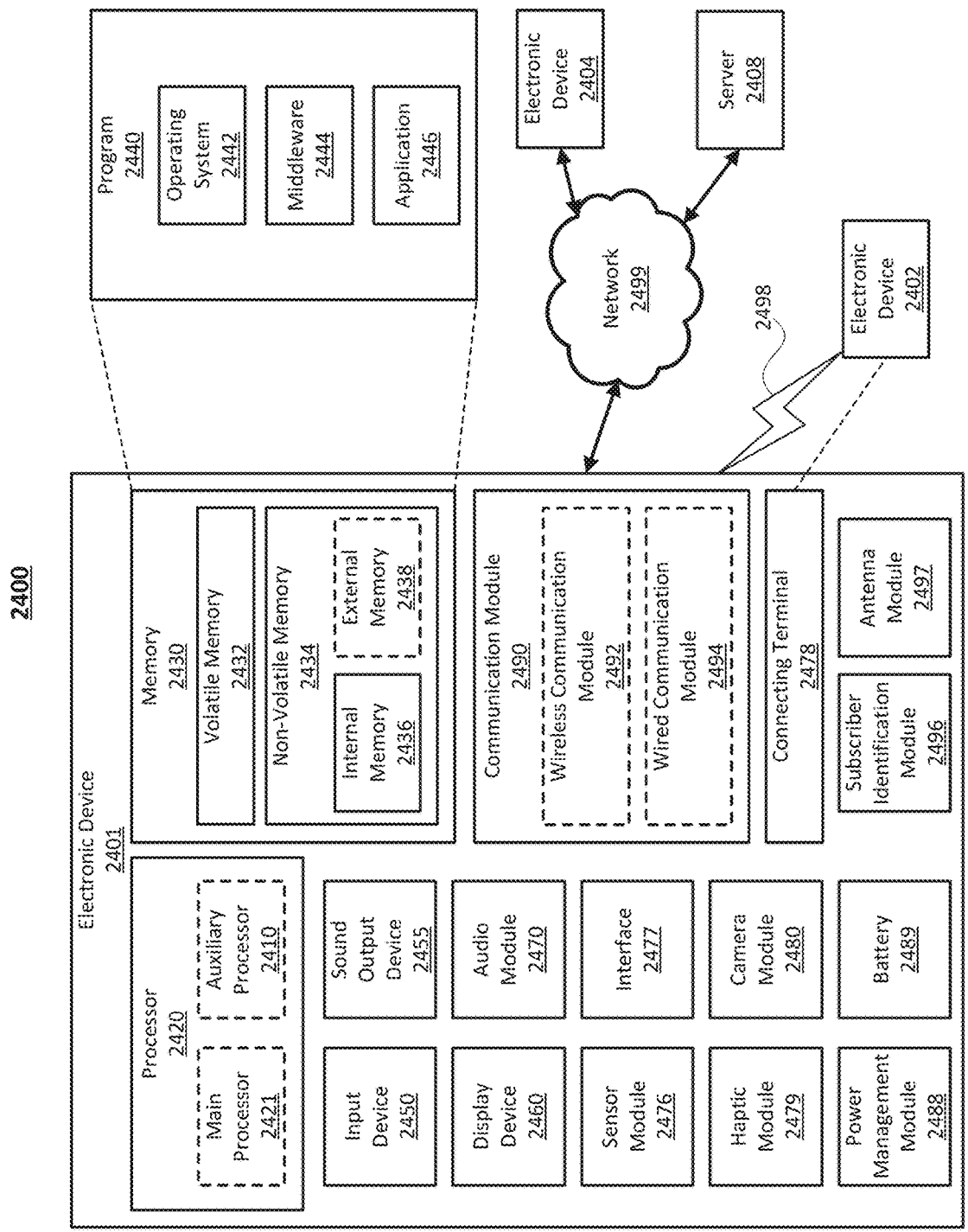
FIG. 24 illustrates a block diagram of an electronic device in a network environment, according to one embodiment.

FIG. 24 illustrates a block diagram of an electronic device 2401 in a network environment 2400, according to one embodiment. Referring to FIG. 24, the electronic device 2401 in the network environment 2400 may communicate with another electronic device 2402 via a first network 2498 (e.g., a short-range wireless communication network), or another electronic device 2404 or a server 2408 via a second network 2499 (e.g., a long-range wireless communication network). The electronic device 2401 may also communicate with the electronic device 2404 via the server 2408. The electronic device 2401 may include a processor 2420, a memory 2430, an input device 2450, a sound output device 2455, a display device 2460, an audio module 2470, a sensor module 2476, an interface 2477, a haptic module 2479, a camera module 2480, a power management module 2488, a battery 2489, a communication module 2490, a subscriber identification module (SIM) 2496, or an antenna module 2497. In one embodiment, at least one (e.g., the display device 2460 or the camera module 2480) of the components may be omitted from the electronic device 2401, or one or more other components may be added to the electronic device 2401. In one embodiment, some of the components may be implemented as a single integrated circuit (IC). For example, the sensor module 2476 (e.g., a fingerprint sensor, an iris sensor, or an illuminance sensor) may be embedded in the display device 2460 (e.g., a display).

The processor 2420 may execute, for example, software (e.g., a program 2440) to control at least one other component (e.g., a hardware or a software component) of the electronic device 2401 coupled with the processor 2420, and may perform various data processing or computations. As at least part of the data processing or computations, the processor 2420 may load a command or data received from another component (e.g., the sensor module 2476 or the communication module 2490) in volatile memory 2432, process the command or the data stored in the volatile memory 2432, and store resulting data in non-volatile memory 2434. The processor 2420 may include a main processor 2421 (e.g., a central processing unit (CPU) or an application processor (AP)), and an auxiliary processor 2423 (e.g., a graphics processing unit (GPU), an image signal processor (ISP), a sensor hub processor, or a communication processor (CP)) that is operable independently from, or in conjunction with, the main processor 2421. Additionally or alternatively, the auxiliary processor 2423 may be adapted to consume less power than the main processor 2421, or execute a particular function. The auxiliary processor 2423 may be implemented as being separate from, or a part of, the main processor 2421.

The auxiliary processor 2423 may control at least some of the functions or states related to at least one component (e.g., the display device 2460, the sensor module 2476, or the communication module 2490) among the components of the electronic device 2401, instead of the main processor 2421 while the main processor 2421 is in an inactive (e.g., sleep) state, or together with the main processor 2421 while the main processor 2421 is in an active state (e.g., executing an application). According to one embodiment, the auxiliary processor 2423 (e.g., an ISP or a CP) may be implemented as part of another component (e.g., the camera module 2480 or the communication module 2490) functionally related to the auxiliary processor 2423.

The memory 2430 may store various data used by at least one component (e.g., the processor 2420 or the sensor module 2476) of the electronic device 2401. The various data may include, for example, software (e.g., the program 2440) and input data or output data for a command related thereto. The memory 2430 may include the volatile memory 2432 or the non-volatile memory 2434.

The program 2440 may be stored in the memory 2430 as software, and may include, for example, an operating system (OS) 2442, middleware 2444, or an application 2446.

The input device 2450 may receive a command or data to be used by other component (e.g., the processor 2420) of the electronic device 2401, from the outside (e.g., a user) of the electronic device 2401. The input device 2450 may include, for example, a microphone, a mouse, or a keyboard.

The sound output device 2455 may output sound signals to the outside of the electronic device 2401. The sound output device 2455 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 2460 may visually provide information to the outside (e.g., a user) of the electronic device 2401. The display device 2460 may include, for example, a display, a hologram device, or a projector and control circuitry to control a corresponding one of the display, hologram device, and projector. According to one embodiment, the display device 2460 may include touch circuitry adapted to detect a touch, or sensor circuitry (e.g., a pressure sensor) adapted to measure the intensity of force incurred by the touch.

The audio module 2470 may convert a sound into an electrical signal and vice versa. According to one embodiment, the audio module 2470 may obtain the sound via the input device 2450, or output the sound via the sound output device 2455 or a headphone of an external electronic device 2402 directly (e.g., wired) or wirelessly coupled with the electronic device 2401.

The sensor module 2476 may detect an operational state (e.g., power or temperature) of the electronic device 2401 or an environmental state (e.g., a state of a user) external to the electronic device 2401, and then generate an electrical signal or data value corresponding to the detected state. The sensor module 2476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2477 may support one or more specified protocols to be used for the electronic device 2401 to be coupled with the external electronic device 2402 directly (e.g., wired) or wirelessly. According to one embodiment, the interface 2477 may include, for example, a high definition multimedia interface (HDMI), a universal serial bus (USB) interface, a secure digital (SD) card interface, or an audio interface.

A connecting terminal 2478 may include a connector via which the electronic device 2401 may be physically connected with the external electronic device 2402. According to one embodiment, the connecting terminal 2478 may include, for example, an HDMI connector, a USB connector, an SD card connector, or an audio connector (e.g., a headphone connector).

The haptic module 2479 may convert an electrical signal into a mechanical stimulus (e.g., a vibration or a movement) or an electrical stimulus which may be recognized by a user via tactile sensation or kinesthetic sensation. According to one embodiment, the haptic module 2479 may include, for example, a motor, a piezoelectric element, or an electrical stimulator.

The camera module 2480 may capture a still image or moving images. According to one embodiment, the camera module 2480 may include one or more lenses, image sensors, ISPs, or flashes.

The power management module 2488 may manage power supplied to the electronic device 2401. The power management module 2488 may be implemented as at least part of, for example, a power management integrated circuit (PMIC).

The battery 2489 may supply power to at least one component of the electronic device 2401. According to one embodiment, the battery 2489 may include, for example, a primary cell which is not rechargeable, a secondary cell which is rechargeable, or a fuel cell.

The communication module 2490 may support establishing a direct (e.g., wired) communication channel or a wireless communication channel between the electronic device 2401 and the external electronic device (e.g., the electronic device 2402, the electronic device 2404, or the server 2408) and performing communication via the established communication channel. The communication module 2490 may include one or more CPs that are operable independently from the processor 2420 (e.g., the AP) and supports a direct (e.g., wired) communication or a wireless communication. According to one embodiment, the communication module 2490 may include a wireless communication module 2492 (e.g., a cellular communication module, a short-range wireless communication module, or a global navigation satellite system (GNSS) communication module) or a wired communication module 2494 (e.g., a local area network (LAN) communication module or a power line communication (PLC) module). A corresponding one of these communication modules may communicate with the external electronic device via the first network 2498 (e.g., a short-range communication network, such as Bluetooth™, wireless-fidelity (Wi-Fi) direct, or a standard of the Infrared Data Association (IrDA)) or the second network 2499 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 2492 may identify and authenticate the electronic device 2401 in a communication network, such as the first network 2498 or the second network 2499, using subscriber information (e.g., international mobile subscriber identity (IMSI)) stored in the subscriber identification module 2496.

The antenna module 2497 may transmit or receive a signal or power to or from the outside (e.g., the external electronic device) of the electronic device 2401. According to one embodiment, the antenna module 2497 may include one or more antennas, and, therefrom, at least one antenna appropriate for a communication scheme used in the communication network, such as the first network 2498 or the second network 2499, may be selected, for example, by the communication module 2490 (e.g., the wireless communication module 2492). The signal or the power may then be transmitted or received between the communication module 2490 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 2401 and the external electronic device 2404 via the server 2408 coupled with the second network 2499. Each of the electronic devices 2402 and 2404 may be a device of a same type as, or a different type, from the electronic device 2401. All or some of operations to be executed at the electronic device 2401 may be executed at one or more of the external electronic devices 2402, 2404, or 2408. For example, if the electronic device 2401 should perform a function or a service automatically, or in response to a request from a user or another device, the electronic device 2401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2401. The electronic device 2401 may provide the outcome, with or without further processing of the outcome, as at least part of a reply to the request. To that end, a cloud computing, distributed computing, or client-server computing technology may be used, for example.

One embodiment may be implemented as software (e.g., the program 2440) including one or more instructions that are stored in a storage medium (e.g., internal memory 2436 or external memory 2438) that is readable by a machine (e.g., the electronic device 2401). For example, a processor of the electronic device 2401 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:
   receiving, by a global navigation satellite system (GNSS) receiver, a GNSS signal;
   rotating, by a carrier rotator, samples of the GNSS signal with carrier phase inputs;
   inverting, by a chip matched filter (CMF), the rotated samples of the GNSS; and
   generating, by the CMF, an output by combining the rotated samples of the GNSS and the inverted samples.

2. The method of claim 1, wherein the samples are based on a multiple of 12 sampling.

3. The method of claim 1, wherein the samples are based on a multiple of 24 sampling.

4. The method of claim 3, wherein rotating the samples further includes rotating and summing two samples.

5. The method of claim 1, further comprising scaling, by a scaler, the rotated samples.

6. The method of claim 1, further comprising selecting, by a BOC selection block, a sample from among a plurality of samples output by the CMF.

7. The method of claim 6, wherein the plurality of samples output by the CMF includes a BOC(1, 1) sample and a BOC(6, 1) sample.

8. The method of claim 6, further comprising correlating, with a correlator, the selected sample with a PN code produced by a coder.

9. The method of claim 1, further comprising delaying, with a plurality of delay blocks, the rotated samples of the GNSS signal.

10. A system, comprising:
    a global navigation satellite system (GNSS) receiver configured to receive a GNSS signal,
    a carrier rotator configured to rotate samples of the GNSS signal with carrier phase inputs; and
    a chip matched filter (CMF) configured to invert the rotated samples of the GNSS and generate an output by combining the rotated samples of the GNSS and the inverted samples.

11. The system of claim 10, wherein the samples are based on a multiple of 12 sampling.

12. The system of claim 10, wherein the samples are based on a multiple of 24 sampling.

13. The system of claim 12, wherein the carrier rotator is further configured to rotate and sum two samples.

14. The system of claim 10, further comprising a scaler configured to scale the rotated samples.

15. The system of claim 10, further comprising a BOC selection block configured to select a sample from among a plurality of samples output by the CMF.

16. The system of claim 15, wherein the plurality of samples output by the CMF includes a BOC(1, 1) sample and a BOC(6, 1) sample.

17. The system of claim 15, further comprising a correlator configured to correlate the selected sample with a PN code produced by a coder.

18. The system of claim 10, further comprising a plurality of delay blocks configured to delay the rotated samples of the GNSS signal.

19. The system of claim 18, wherein the CMF is configured to invert the rotated samples by summing the rotated samples with the delayed rotated samples.

20. A method, comprising:
    receiving, by a global navigation satellite system (GNSS) receiver, a GNSS signal;
    rotating, by a carrier rotator, samples of the GNSS signal with carrier phase inputs;
    inverting, by a chip matched filter (CMF), the rotated samples;
    generating, by the CMF, an output based on the inverted samples; and
    delaying, with a plurality of delay blocks, the rotated samples of the GNSS signal,
    wherein inverting the rotated samples comprises summing the rotated samples with the delayed rotated samples.

* * * * *